(12) United States Patent
Tanner et al.

(10) Patent No.: US 10,669,048 B1
(45) Date of Patent: Jun. 2, 2020

(54) MECHANISM FOR INCREASING JETTISON CLEARANCE

(71) Applicant: United Launch Alliance, L.L.C., Englewood, CO (US)

(72) Inventors: Trevor M. Tanner, Highlands Ranch, CO (US); Michael W. Clarke, Highlands Ranch, CO (US); Philip M. Echelman, Denver, CO (US)

(73) Assignee: United Launch Alliance, L.L.C., Englewood, CO (US)

( * ) Notice: Subject to any disclaimer, the term of this patent is extended or adjusted under 35 U.S.C. 154(b) by 322 days.

(21) Appl. No.: 15/624,573

(22) Filed: Jun. 15, 2017

(51) Int. Cl.
 *B64G 1/64* (2006.01)

(52) U.S. Cl.
 CPC ............. *B64G 1/645* (2013.01); *B64G 1/641* (2013.01)

(58) Field of Classification Search
 CPC ........ B64G 1/641; B64G 1/002; B64G 1/222; B64G 1/645; F16B 17/00; F16B 1/004; F42B 15/36
 See application file for complete search history.

(56) References Cited

U.S. PATENT DOCUMENTS

| | | | | |
|---|---|---|---|---|
| 3,633,456 A | * | 1/1972 | Carr | F42B 15/38 89/1.14 |
| 4,009,851 A | * | 3/1977 | Cable | B64G 1/10 244/173.1 |
| 4,406,097 A | * | 9/1983 | Meston | B64G 1/222 182/195 |
| 4,419,033 A | * | 12/1983 | Roth | B64G 1/222 244/172.9 |
| 4,715,565 A | * | 12/1987 | Wittmann | B64G 1/641 102/377 |
| 4,896,848 A | * | 1/1990 | Ballard | B64G 1/007 244/171.3 |
| 4,917,222 A | * | 4/1990 | Simon Bacardit | F16F 9/504 137/39 |
| 5,129,602 A | * | 7/1992 | Leonard | B64G 1/002 244/172.2 |

(Continued)

FOREIGN PATENT DOCUMENTS

| | | |
|---|---|---|
| DE | 4032112 | 4/1992 |
| EP | 0296936 | 12/1988 |

OTHER PUBLICATIONS

Suresh et al. "Stage Auxiliary Systems," Integrated Design for Space Transportation System, Springer, New Delhi, 2015, pp. 539-580 (Abstract only) [retrived online from: link.springer.com/chapter/10.1007%2F978-81-322-2532-4_13].

(Continued)

*Primary Examiner* — Medhat Badawi
(74) *Attorney, Agent, or Firm* — Sheridan Ross P.C.

(57) ABSTRACT

Embodiments of the present invention generally relate to a novel system, device, and methods for providing a one-way locking mechanism that changes the shape or stiffness of a structure. More specifically, embodiments of the present invention relate to a mechanism for increasing fairing jettison clearance. Embodiments of the present invention permit outward breathing displacement by the fairing, but reduce the inward breathing displacement by the fairing such that the fairing does not hit and damage the spacecraft or vehicle as it is jettisoned from the spacecraft or vehicle.

22 Claims, 12 Drawing Sheets

(56) References Cited

U.S. PATENT DOCUMENTS

| | | | | |
|---|---|---|---|---|
| 5,226,617 A * | 7/1993 | Panin | B64G 1/641 | 244/173.3 |
| 5,318,255 A * | 6/1994 | Facciano | F42B 15/36 | 102/378 |
| 5,411,349 A * | 5/1995 | Hornung | B64G 1/641 | 403/338 |
| 5,529,264 A * | 6/1996 | Bedegrew | B64F 1/04 | 102/274 |
| 5,585,596 A * | 12/1996 | Richards | B64G 1/641 | 102/378 |
| 5,586,627 A * | 12/1996 | Nezu | B60G 17/08 | 188/266.6 |
| 5,613,653 A * | 3/1997 | Bombled | B64G 1/641 | 244/173.1 |
| 5,670,758 A * | 9/1997 | Borchers | B64G 1/002 | 181/286 |
| 5,697,108 A * | 12/1997 | Culbertson, Jr. | A62B 17/006 | 2/2.11 |
| 5,743,492 A * | 4/1998 | Chan | B64F 1/04 | 102/274 |
| 5,755,406 A * | 5/1998 | Aston | B64G 1/1007 | 244/159.4 |
| 5,904,317 A * | 5/1999 | Elliott | B64G 1/22 | 244/1 N |
| 5,969,287 A * | 10/1999 | Blain | F42B 15/38 | 102/275.5 |
| 5,984,235 A * | 11/1999 | Snowhook | B64G 1/007 | 244/171.3 |
| 6,036,144 A * | 3/2000 | Sisk | B64G 1/002 | 102/374 |
| 6,076,467 A * | 6/2000 | Cespedosa | B64G 1/641 | 102/377 |
| 6,126,115 A * | 10/2000 | Carrier | B64G 1/641 | 244/137.4 |
| 6,193,187 B1 * | 2/2001 | Scott | B64G 1/14 | 244/159.3 |
| 6,227,493 B1 * | 5/2001 | Holemans | B64G 1/641 | 244/173.1 |
| 6,237,876 B1 * | 5/2001 | Barker | B64G 1/007 | 244/164 |
| 6,343,770 B2 | 2/2002 | Holemans | | |
| 6,357,699 B1 * | 3/2002 | Edberg | B64G 1/641 | 102/377 |
| 6,390,416 B2 * | 5/2002 | Holemans | B64G 1/641 | 244/173.3 |
| 6,394,394 B1 * | 5/2002 | Raun | B64G 1/002 | 244/1 N |
| 6,450,064 B1 * | 9/2002 | Christiansen | B64G 1/645 | 403/343 |
| 6,454,214 B1 * | 9/2002 | Smith | B64G 1/641 | 102/377 |
| 6,494,406 B1 * | 12/2002 | Fukushima | B64G 1/002 | 244/173.3 |
| 6,648,543 B2 * | 11/2003 | Arulf | B64G 1/641 | 403/334 |
| 6,676,151 B2 * | 1/2004 | Mangold | A63C 5/075 | 280/602 |
| 6,679,177 B1 * | 1/2004 | Wu | F42B 15/36 | 102/377 |
| 6,712,542 B2 * | 3/2004 | Buder | B64G 1/641 | 24/279 |
| 6,781,284 B1 * | 8/2004 | Pelrine | F04B 35/00 | 310/330 |
| 6,920,966 B2 * | 7/2005 | Buchele | B64G 1/641 | 188/268 |
| 7,007,896 B2 * | 3/2006 | Telford | B64G 1/641 | 244/173.2 |
| 7,114,683 B2 * | 10/2006 | Hall | B64G 1/002 | 244/173.1 |
| 7,127,994 B2 * | 10/2006 | Cleveland | B64G 1/645 | 102/378 |
| 7,275,285 B1 * | 10/2007 | Lorell | B64G 1/222 | 16/278 |
| 7,296,818 B2 * | 11/2007 | Krumbeck | A63C 5/07 | 280/11.14 |
| 7,678,440 B1 * | 3/2010 | McKnight | B32B 3/26 | 148/563 |
| 7,922,125 B2 * | 4/2011 | Lancho Doncel | B64G 1/641 | 102/377 |
| 8,141,491 B1 * | 3/2012 | Travis | F42B 15/38 | 102/377 |
| 8,187,006 B2 * | 5/2012 | Rudisill | H01R 11/30 | 362/249.06 |
| 8,939,409 B2 * | 1/2015 | Apland | B64G 1/641 | 244/173.1 |
| 9,007,598 B1 * | 4/2015 | Clark | G01C 19/66 | 356/459 |
| 9,180,982 B2 * | 11/2015 | Baghdasarian | B64G 1/222 | |
| 9,303,484 B2 * | 4/2016 | Storey | E21B 33/1285 | |
| 10,011,373 B1 * | 7/2018 | Echelman | B64G 1/645 | |
| 10,190,537 B2 * | 1/2019 | Scarr | F16B 2/08 | |
| 2003/0150958 A1 * | 8/2003 | Herbert | B64G 1/10 | 244/159.4 |
| 2007/0228219 A1 * | 10/2007 | Behrens | B64G 1/1078 | 244/172.5 |
| 2007/0228220 A1 * | 10/2007 | Behrens | B64G 1/1078 | 244/172.5 |
| 2011/0027038 A1 * | 2/2011 | Hsu | H01L 23/4093 | 411/105 |
| 2012/0055632 A1 * | 3/2012 | de la Llera | H01R 13/20 | 156/345.34 |
| 2012/0227374 A1 * | 9/2012 | Zegler | F02K 9/44 | 60/204 |
| 2013/0099059 A1 * | 4/2013 | Cheynet De Beaupre | B64G 1/10 | 244/158.1 |
| 2014/0147228 A1 * | 5/2014 | Kobayashi | F16B 31/02 | 411/103 |
| 2015/0329224 A1 * | 11/2015 | Sachdev | B64G 1/641 | 244/173.3 |
| 2016/0111818 A1 * | 4/2016 | Concilio | F42B 15/00 | 439/372 |

OTHER PUBLICATIONS

Ozenne et al. "Part 2: Shock input derivation to space segment elements and equipment," European Space Agency, Nov. 2015, 23 pages.

Robbins "Ground Test Program for New Atlas Payload Fairings," NASA, Langley Research Center, Research in Structures, Structural Dynamics and Materials, Mar. 1990, pp. 193-205.

* cited by examiner

MECHANISM FOR INCREASING JETTISON CLEARANCE

FIELD OF THE INVENTION

Embodiments of the present invention generally relate to a one-way locking mechanism that changes the shape or stiffness of a structure, and more specifically to a mechanism for increasing fairing jettison clearance.

BACKGROUND OF THE INVENTION

A launch vehicle is used to launch a payload into orbit around the earth or toward a path outside of earth's orbit. A fairing (also referred to as a payload fairing or a launch vehicle adapter ("LVA") fairing) is typically used to protect the payload or other portions of the upper stage before and during launch. A payload fairing surrounds the payload in the nose portion of the launch vehicle and a LVA fairing typically surrounds a portion of the spacecraft aft of the LVA or upper stage. The term "fairing" is used herein to reference all types of fairings. The fairing is detachably mounted to the upper stage of the launch vehicle. Once the rocket leaves earth's atmosphere, the fairing is separated from the launch vehicle and discarded to eliminate weight and prepare for separation of the payload. See FIG. 1 showing a launch vehicle 4 (also called a vehicle herein) with two fairings 8A, 8B separated from the spacecraft 12 (also called a payload herein). Each fairing 8A, 8B has a height H, a bottom edge 16 opposite a tip 20, a first axial edge 24 separated from a second axial edge 28 by the bottom edge 16. The fairings 8A, 8B have a half cylinder or an arcuate shape with a partial circumference (i.e., arc length), radius, radius of curvature, an interior surface (also called an inboard surface herein) 32, and an exterior surface (also called an outboard surface herein) 36. The cross-hatching (shading) on the fairings 8A, 8B show the areas of the fairings 8A, 8B that experience the most inward and outward deflection during jettison.

Typically, explosives (e.g., high-energy linear explosive rails), balloons, ballasts, or other force imparting systems are used to separate the two or more payload fairings from each other and from the launch vehicle and to push the payload fairings away from the launch vehicle or spacecraft. FIG. 2A shows a cross-section of the launch vehicle 4 with two fairings 8A, 8B before the fairings 8A, 8B have separated from the spacecraft 12, i.e., at time t0. The fairings 8A, 8B have a width W extending from one edge 24 to the other edge 28. The inner radius R1, R1' of the fairings at time t0 is shown and is also called the fairing's static inner radius R1, R1'. Dimension R1 corresponds to the edges 24, 28 of the fairing 8A, 8B and dimension R1' corresponds to the centerline or apex 50 (also called the backbone region) of the fairing 8A, 8B. R1=R1' at time t0. As the fairings 8A, 8B are jettisoned away from the spacecraft 12, the fairings 8A, 8B first flex or "breathe" outward and away from the spacecraft 12 due to the forces imparted on the fairings 8A, 8B to push the fairings 8A, 8B away from the vehicle 4. This is shown in FIG. 2B by the fairings $8A_1$, $8B_1$ in solid lines. FIG. 2B is also a cross-sectional view of the launch vehicle 4 shown in FIG. 2A, but at a later time t1. The solid line fairings $8A_1$, $8B_1$ at time t1, just after the fairings $8A_1$, $8B_1$ have been jettisoned away from the spacecraft 12, flex or breathe outward as a result of the separation. As each fairing $8A_1$, $8B_1$ breathes outward, its inner radius R2 at the edges 24, 28 and its distance from the spacecraft increase compared to that shown in FIG. 2A. Thus, R2 is greater than R1 (R2>R1). Conversely, dimension R2' corresponding to the fairing centerline or apex 50 decreases compared to dimension R1'. Thus, R2'<R1'. Next, at time t2, the fairing $8A_2$, $8B_2$ seeks to return to the natural shape following dissipation of the separation energy. Each fairing $8A_2$, $8B_2$ flexes or breathes inward toward the spacecraft 12 as shown by the fairings $8A_2$, $8B_2$ in dashed lines in FIG. 2B. The inward breathing of the fairing $8A_2$, $8B_2$ reduces the fairing's inner radius R3 to less than the fairing's original static inner radius R1 and increases the dimension R3' compared to dimension R1'. If the fairings $8A_2$, $8B_2$ are not far enough away from the spacecraft 12 at time t2, then the recoiling edges 24, 28 of the fairings $8A_2$, $8B_2$ will hit and can damage the spacecraft 12 or vehicle 4.

Prior solutions to the problem of the fairings flexing or breathing inward and hitting the spacecraft or vehicle include ensuring that the radial jettison velocity is large enough that the fairing has separated far enough away to gain clearance to accommodate the recoil or inward breathing of the fairing at the fairing split-line. However, maintaining clearance to the non-jettisoning hardware is challenging. One solution is to increase the energy of the separation explosion to ensure the fairing is sufficiently separated from the spacecraft such that the recoil of the fairing is irrelevant. However, high-energy linear explosive rails create significant vibrations and shocks that can damage components and instrumentation. Similarly, connections based on pyrotechnic strings or explosive bolts are effective and reliable but they generate high levels of vibratory disturbance or shocks which move along the whole vehicle and spacecraft until reaching the most sensitive elements. Mission success of spacecraft, aircraft, and rockets is dependent upon components and instrumentation continuing to operate throughout an entire flight and beyond deployment, for example, in the case of a satellite. Previous attempts also include ballasts added to the split-line in order to achieve the clearance needed. However, these ballasts add significant weight—which is not desired for spacecraft or vehicles. It takes a significant split-line ballast to achieve even a small increase in breathing clearance. In other prior art solutions, supplemental springs are used to increase the clearance distance by modifying the trajectory of the fairing, but the energy per mass and volume in springs is low, and therefore not ideal for applications where weight or space is limited. Additionally, springs can be used to supplement the jettison of a fairing whose primary separating force is a bellows, or the like, or linear explosive assembly. Alternatively, springs can be used as the primary separating force themselves, which will impart less energy into the fairing separation and which generally does not excite the breathing modes as significantly due to springs' lower energy content. However, separation velocity is generally also decreased with springs.

Another existing solution is to decrease the breathing frequency of the fairing by decreasing the stiffness of the fairing in the breathing direction. However, this solution has drawbacks, including a softer, and often heavier, fairing that typically conflicts with other requirements for buckling strength and vibro-acoustics.

Accordingly, there exists a significant and long-felt need for a mechanism that increases fairing jettison clearance without adding significant extra weight and without creating additional vibrations and shocks.

SUMMARY OF THE INVENTION

Aspects of the present disclosure relate to novel systems, devices, and methods for providing a mechanism that uses deflection to lock a structure in a more open position, and more specifically to a one-way locking mechanism for increasing jettison clearance. The mechanism allows the shape or stiffness of a structure to change during jettison and then holds the new shape. The novel mechanisms are lighter, less expensive, and outperform prior art mechanisms used to increase jettison clearance. Additionally, the novel mechanisms allow for larger payloads to fit within the same fairing envelope than previous designs because previous designs needed more clearance between the payload/spacecraft and the vehicle.

It is one aspect of embodiments of the present invention to provide a mechanism that permits outward flexing or breathing displacement by the fairing and also reduces the inward breathing displacement by the fairing such that the fairing does not hit and damage the spacecraft or vehicle after being jettisoned from the spacecraft or vehicle. Embodiments of the present invention permit the fairing to flex or breathe outwardly by only minimally contributing to the outward breathing stiffness and deflection of the fairing. In some embodiments of the present invention, the recoil or inward breathing displacement of the fairing is reduced by locking the fairing in a more open position (i.e., a position with the larger inner radius at the fairing edges). In some embodiments, the present invention uses a one-way locking mechanism to lock the fairing in an open position.

Embodiments of the present invention provide a mechanical means to alter the stiffness (e.g., the breathing stiffness), the displacement (e.g., the breathing displacement), and the static form of the jettisoned structure. Embodiments of the present invention use a mechanical means to alter the breathing stiffness by preventing or limiting the amount the fairing can flex or breathe inward after being jettisoned from the spacecraft. Further, embodiments of the present invention use a mechanical means to alter the breathing displacement of the fairing by limiting the amount the fairing can displace inwardly after jettison. Finally, some embodiments of the present invention use a component or subassembly to alter the post-jettison static form of the jettisoned structure after the fairing is jettisoned from the spacecraft by locking the fairing in an open position and changing its post-jettison static form.

Another aspect of embodiments of the present invention is to provide a mechanism to increase jettison clearance that also allows the fairing to be stiffer. A stiffer payload fairing is desirable for a number of reasons, including that it increases the overall strength of the fairing and reduces the low frequency vibration responses in flight. Additionally, vehicle hardware is more efficient when it is stiffer and lighter, but that is in direct conflict with jettison clearance because, traditionally, to obtain positive jettison clearances a soft and heavy fairing was desired. Therefore, the present invention can be associated with a fairing that is stiffer than traditional fairings and the mechanism will still increase the jettison clearance between the fairing and the spacecraft or vehicle. Accordingly, embodiments of the present invention remove conflicts in requirements between jettison clearance, shock environments, vibro-acoustics, and strength.

Another aspect of embodiments of the present invention is to provide a mechanism to increase jettison clearance that also increases the payload/spacecraft volume and provides a more efficient overall design. Payload volume is increased through embodiments of the present invention because less static clearance between the payload and fairings is needed, meaning there is less space between the payload and the fairings. Thus, the fairings have a smaller diameter than in previous designs and/or the payload can be larger than in previous designs. Smaller fairings are typically lighter weight and less expensive. Additionally, the fairing can be lighter and stiffer than in previous designs because the present invention increases jettison clearance.

It is another aspect of embodiments of the present invention to provide a one-way locking mechanism that changes the shape or stiffness of a structure (e.g., piece of equipment or vehicle component) using deflection. Embodiments of the mechanism prevent, or at least limit, the amount of displacement in one direction—for example, the inward direction. The mechanism allows expansion in the opposite direction—for example, the outward direction. In some embodiments, the present invention is a mechanical means applied to the payload fairing to alter the breathing stiffness, displacements, and static form of the fairing after it has been jettisoned away from the spacecraft.

It is one aspect of embodiments of the present invention to provide a one-way locking mechanism to increase jettison clearance that is positioned in an accessible location for installation, modifications, and repair. Additionally, the location of the mechanism limits damage to the mechanism during launch and spaceflight. Therefore, in some embodiments described herein, the novel one-way locking mechanism is placed on the inboard face of the fairing. In an alternative embodiment, a portion of the novel one-way locking mechanism is placed on the outboard face of the fairing while the remaining portions of the mechanism are on the inboard face of the fairing. The mechanism can be positioned on the central section of the jettisoned structure in the area where the structure experiences the greatest amount of strain, e.g., the backbone region of a fairing, which is proximate the apex or centerline of the fairing. It should be further appreciated that multiple mechanisms may be employed, rather than a single mechanism.

The mechanism is also positioned in a location where it will not interfere with other components, such as the explosive rails or ballasts along the split line, and still have a significant impact on the inward breathing displacement. In various embodiments, the novel one-way locking mechanism is positioned proximate the apex of the fairing at one or more locations along the height or longitudinal axis of the fairing.

It is one aspect of embodiments of the present invention to provide a mechanical means to alter the breathing stiffness and the inward breathing displacement of a jettisoned structure that is easy and inexpensive to manufacture. In some embodiments, the mechanism has gaps, slots, or holes that open during jettison and then are plugged by pins, wedges, shims, or other devices to prevent inward deflection. The mechanism uses simple and easy to manufacture shapes and parts.

In one embodiment, the novel mechanism includes a band portion with an aperture and a slit extending from the aperture to one edge of the band portion, and a spring-loaded pin with a spring, nut, and a pin with a head, cylindrical portion, and thick cylindrical portion positioned between the head and the cylindrical portion. The initial aperture is the size of the cylindrical portion of the pin (or slightly larger) and is smaller than the size of the thick cylindrical portion of the pin. As the fairing breathes outward, the aperture and slit open allowing the thick cylindrical portion of the pin to fall down (or be pushed by the spring) into the now-larger aperture. The thick cylindrical portion prevents the aperture and slit from closing and returning to their original shapes, thus changing the fairing's static form to be in a more open position and also increasing the inward breathing stiffness of the fairing to limit the amount the fairing can breathe inward. In further embodiments, multiple band portions or mechanisms are positioned side-by-side along the inboard face of the fairing.

Another embodiment is a simplified version of the mechanism described above because it does not use the spring-loaded pins. This embodiment includes a band (also called an elongate member herein) positioned along the inboard face of the fairing. The band may be comprised of multiple smaller bands side-by-side or may be one big band with slits extending from the inboard surface of the band to the band's surface proximate the inboard surface of the fairing proximate the backbone region. The slits allow the band to expand or breathe outward because it can separate along the slits, but the band limits the amount the fairing can breathe inward because it increases the fairing's inward breathing stiffness. However, this embodiment cannot alter the static form of the fairing, meaning it cannot lock the fairing in a more open position than the original static position. Rather, the band increases the inward breathing stiffness of the fairing to reduce the maximum inward breathing displacement of the jettisoned fairing and, thus, reduces the risk of spacecraft damage during fairing separation.

Another embodiment of the novel mechanism includes two racks of teeth positioned on the inboard surface of the fairing at the apex of the fairing. In this embodiment, as the fairing breathes outward during jettison, the teeth slide past each other. Then, when the fairing starts to breathe inward, the teeth catch one another and lock to lock the fairing in a more open position and limit the fairing's inward displacement during inward breathing. Thus, this embodiment changes both the static form of the jettisoned fairing and the inward breathing stiffness of the fairing. This embodiment permits outward breathing of the fairing because it does not increase the outward breathing stiffness of the fairing.

Yet another embodiment of the present invention uses a spring-tensioned webbing strap on the outboard face of the structure (e.g., fairing) and each end of the strap is in tension with a torsion spring housed in an inertia reel. As the fairing initially breathes outward after jettison, the strap is retracted into the inertial reels. Then as the fairing breathes inward, the inertial reels lock and prevent the strap from unwinding out of the reels to change both the static form of the jettisoned fairing and the inward breathing stiffness of the fairing. This embodiment permits outward breathing of the fairing because it does not increase the outward breathing stiffness of the fairing.

An additional embodiment includes a damper with a piston, where a rod interconnected to the piston on one end is interconnected to the interior surface of the fairing on the other end. Generally, extension of the damper would occur during the initial outward breathing of the fairing, as excited by the initial separation force impulse. A very low damping force would be applied during the extension stroke (while the fairing is breathing outward) allowing the fairing to open as far as it can during the initial breathing. As the fairing transitions from the initial outward breathing, the damper also transitions to a compression stroke. The damping on the compression stroke would provide a very high force to slow the rate of inward breathing significantly. Therefore, the damper is set for very overdamped during the compression stroke when the fairing begins to breathe inward. Accordingly, compression would be contraction of the damper from the extended state post-jettison after the fairing begins to breathe inward back toward the payload or vehicle.

The damper has a housing with a valve on one end and the rod interconnected to the piston exits the housing on the other end. The housing may be a cylindrical housing or have any other shape known in the art. The valve may be a one-way valve, or other type of valve used in dampers or shock absorbers. In its static state before fairing separation, the piston is mostly in the housing of the damper and is positioned proximate the end of the housing with the valve. As the fairing breathes outward, the piston is pulled away from the valve and toward the other end of the housing. The housing also fills with fluid that enters through the valve as the piston is pulled away from the valve and toward the other end of the housing. The fluid could be hydraulic fluid, air, or another fluid. When the fairing begins to breathe inward, the damper restricts motion of the piston in an inward direction, which restrains the fairing motion, because the fluid now in the damper cannot exit through the valve or can only exit the valve very slowly. Thus, the fairing is restrained in a more open position by the damper. In further embodiments, more than one damper can be used. The dampers may be linearly aligned horizontally or vertically, or in any other orientation, or as an array. The dampers may also cross over one another depending on the number of dampers desired.

The damper may be similar to a shock absorber or hydraulic shock absorber. Accordingly, U.S. Pat. No. 5,586,627 to Nezu et al. entitled "Hydraulic Shock Absorber of Damping Force Adjustable Type" and U.S. Pat. No. 4,917,222 to Bacardit entitled "Shock Absorber" are incorporated by reference herein in their entireties.

In one embodiment, a mechanism for increasing jettison clearance is provided comprising: a band for interconnection to an inner surface of a jettisoned structure, the band comprising: an upper surface; a lower surface opposite the upper surface; an inner surface; an outer surface opposite the inboard surface and proximate the inner surface of the jettisoned structure; a plurality of apertures; and a plurality of slits, wherein each slit extends from each aperture to the inner surface of the band; a plurality of blocking members, wherein each blocking member comprises: a biasing member; a locking mechanism; and a pin having a head on a first end, the head interconnected to an enlarged portion that is interconnected to a cylindrical portion extending to a second end; wherein each blocking member is positioned in each aperture.

In additional embodiments, the head of the pin is positioned above the band and the biasing member is positioned below the band and when the mechanism is in a first position the cylindrical portion of the pin is positioned in the aperture, and when the mechanism is in a second position the enlarged portion of the pin is positioned in the aperture. In further embodiments, the biasing member is a spring and the locking mechanism is a nut with a threaded through hole, and wherein the lower portion of the cylindrical portion is threaded to threadingly engage the nut; the mechanism is positioned on an interior surface of a fairing; and/or the mechanism is positioned on a backbone region of the fairing. In some embodiments, the enlarged portion of the pin comprises a tapered surface proximate the cylindrical portion to facilitate movement into the aperture and the band increases an inward breathing stiffness of the fairing.

In one embodiment, an apparatus for altering the shape of a fairing following separation from a spacecraft is provided comprising: a fairing having a curved shape with an interior surface, an exterior surface, a first edge, a second edge, and a width defined as the dimension between the first edge and the second edge; a band disposed along at least a portion of the width of the interior surface of the fairing, the band having a plurality of adjacent band portions; at least one band portion having an aperture extending through the band portion, and a slot extending through the band portion and extending from the aperture to a first edge of the band portion; a blocking member positioned adjacent the aperture, the blocking member having a size larger than the aperture; a biasing mechanism associated with the blocking member and configured to force the blocking member into the aperture, wherein when the fairing is flexed outward, the slot in the at least one band portion separates and the aperture in the at least one band portion enlarges and the biasing mechanism forces the blocking member into the aperture.

In further embodiments, the blocking member comprises a pin having a first end and a second end, a head portion positioned proximate first end, an enlarged body portion positioned adjacent the head, and a second body portion positioned at the second end, and wherein when the fairing is connected to the spacecraft, the enlarged body portion is oriented adjacent to the aperture, and when the fairing is flexed outward, the enlarged body portion is forced into the aperture by the biasing mechanism and the biasing mechanism comprises a spring configured to force the enlarged body portion of the pin into the aperture when the size of the aperture is enlarged. In some embodiments, the enlarged body portion of the pin comprises a tapered surface to facilitate movement into the aperture and further comprising a platform affixed to the pin proximate the second end, and the wherein the spring is positioned between the platform and the band portion and the second body portion of the pin is threaded and the platform is a nut threaded to the second body portion of the pin. In various embodiments, the band further comprises a plurality of apertures, each aperture having an associated slot extending through the band from the aperture to the first edge of the band and/or the apparatus further comprises a plurality of adjacent bands, wherein at least some of the bands include apertures, slots, blocking members, and biasing members. In further embodiments, the apparatus comprises a plurality of adjacent bands, wherein each band in the plurality of bands comprises an aperture, a slot, a blocking member, and a biasing member.

In one embodiment, a method of constructing a fairing for use with a spacecraft is provided comprising: providing a panel structure, the panel structure having an interior surface, an exterior surface, a bottom edge, and a first side edge and a second side edge separated by the bottom edge; mounting an elongated band to the interior surface of the panel structure, the elongated band comprising at least one aperture extending through the elongated band and at least one slot extending through the elongated band from the aperture to an interior surface of the elongated band; mounting a blocking member in association with the at least one aperture, the blocking member configured to move between a first position adjacent the at least one aperture and a second position inside the at least one aperture; mounting a biasing member in association with the blocking member, the biasing member configured to move the blocking member from the first position to the second position upon enlargement of the at least one aperture.

In further embodiments, the step of mounting the elongated band comprises mounting a plurality of adjacent band portions to form the elongated band, wherein some of the band portions comprise an aperture extending through the band portion and a slot extending from the aperture to an interior surface of the band portion. Moreover, mounting a blocking member comprises mounting a pin having a first end opposite a second end, a head portion positioned proximate first end, an enlarged body portion positioned adjacent the head, and a second body portion positioned at the second end, wherein the enlarged body portion is seated at one end of the aperture and is sized larger than the aperture and mounting the biasing member comprises mounting a spring on an opposite side of the band from the enlarged body portion of the pin and/or the biasing member comprising a spring, and the method further includes mounting the spring on the same side of the band as the enlarged body portion.

In one embodiment, a fairing is provided comprising: an interior surface; an exterior surface; a first axial edge; a second axial edge; an arcuate shape with a radius; an apex between the first axial edge and the second axial edge; and an apparatus for controlling a shape of the fairing following separation from a spacecraft, the apparatus comprising: an elongate member made of substantially incompressible material, wherein the elongate member is positioned along at least a portion of the interior surface of the fairing and proximate the apex of the fairing, the elongate member comprising: a first side positioned opposite the interior surface of the fairing; an upper surface extending from the first side to the interior surface of the fairing; a lower surface opposite the upper surface and extending from the first side to the interior surface of the fairing; a plurality of slits extending from the portion of the elongate member proximate the interior surface of the fairing to the first side and extending from the upper surface to the lower surface, wherein the plurality of slits allows the elongate member to separate along the plurality of slits which allows the fairing to breathe outward following fairing separation, and wherein when the fairing recoils inward during inward breathing the elongate member limits an inward breathing displacement of the fairing by increasing an inward breathing stiffness of the fairing.

In further embodiments, the apparatus for controlling the shape of the fairing limits the amount a radius of curvature of the fairing can decrease following separation from the spacecraft and the fairing has a first radius of curvature proximate the apex prior to separation from the spacecraft, a second radius of curvature proximate the apex following separation and while the fairing is breathing outward, and a third radius of curvature as the fairing breathes inward, wherein the apparatus prevents the third radius of curvature from being significantly smaller than the first radius of curvature. In some embodiments, the first axial edge is positioned a distance from the spacecraft after the fairing separates from the spacecraft, and wherein the apparatus limits the amount the distance can decrease as the fairing breathes inward.

In one embodiment, a fairing is provided comprising: a curved shape with an interior surface; first axial edge; a second axial edge; an arcuate shape with an arc length and a radius; an apex between the first axial edge and the second axial edge; a height; and a means for altering the shape of the fairing following separation from a spacecraft, wherein the means for altering the shape of the fairing limits a distance the fairing can breathe inward following outward breathing after separating from the spacecraft. In additional embodiments, the means for altering the shape of the fairing comprises: an elongate member configured to be disposed along at least a portion of the arc length of the interior surface of the fairing and proximate the apex of the fairing, wherein the elongate member comprises: a plurality of adjacent band portions, wherein each band portion in the plurality of adjacent band portions has a rear side positioned adjacent the interior surface of the fairing, an interior side positioned opposite the interior surface of the fairing, a first side, and a second side, wherein some of the band portions have a toothed portion extending outward from the interior side, the toothed portion having a curved outer surface and a substantially flat surface positioned along the first side, and wherein the band portions with toothed portions are positioned adjacent one another; and a slit between each band portion allowing the band portions to separate from one another as the fairing breathes outward following separation from the spacecraft; a pawl with a head on one end, the head shaped to engage the curved outer surface of one toothed portion and the substantially flat surface of a second toothed portion; and a bar with a first end interconnected to an end of the pawl opposite the head of the pawl and a second end interconnected to the interior surface of the fairing; wherein the pawl slides along the toothed portions toward the first axial edge or the second axial edge of the fairing as the fairing breathes outward and the pawl locks on the toothed portions to limit the amount of inward displacement experienced by the fairing as the fairing breathes inward.

In one embodiment, the means for altering the shape of the fairing comprises: a damper positioned along at least a portion of the arc length of the interior surface of the fairing and proximate the apex of the fairing, the damper comprising: a piston; a rod interconnected to the piston; and a housing with a valve on a first end and the rod exiting a second end of the housing; wherein as the fairing breathes outward, the piston is pulled away from the valve and toward the second end of the housing and the housing fills with fluid that enters through the valve; wherein when the fairing begins to breathe inward, the damper restrains the motion of the piston and the fluid is substantially trapped in the housing. In some embodiments, the housing is a cylindrical housing. In additional embodiments, the valve is a one-way valve.

In another embodiment, the means for altering the shape of the fairing comprises: a housing having a first end and a second end; a rod at least partially positioned in the housing and having a first end interconnected to a piston and a second end opposite the first end, wherein the piston is positioned in the housing; a valve positioned proximate the first end of the housing; a first mount positioned proximate the housing first end, wherein the first mount is interconnected to the interior surface of the fairing and the first end of the housing; a second mount positioned proximate the rod second end, wherein the second mount is interconnected to the interior surface of the fairing and the second end of the rod; and wherein the piston is configured to move away from the housing first end and is configured to not move toward the housing first end.

In one embodiment, an apparatus for altering the shape of a fairing following separation from a spacecraft is provided comprising: a fairing having a curved shape with an interior surface, first axial edge, a second axial edge, an arcuate shape with an arc length and a radius, an apex between the first axial edge and the second axial edge, and a height; an elongate member configured to be disposed along at least a portion of the arc length of the interior surface of the fairing and proximate the apex of the fairing, wherein the elongate member comprises: a plurality of adjacent band portions, wherein each band portion in the plurality of adjacent band portions has a rear side positioned adjacent the interior surface of the fairing, an interior side positioned opposite the interior surface of the fairing, a first side, and a second side, wherein some of the band portions have a toothed portion extending outward from the interior side, the toothed portion having a curved outer surface and a substantially flat surface positioned along the first side, and wherein the band portions with toothed portions are positioned adjacent one another; and a slit between each band portion allowing the band portions to separate from one another as the fairing breathes outward following separation from the spacecraft; a pawl with a head on one end, the head shaped to engage the curved outer surface of one toothed portion and the substantially flat surface of a second toothed portion; and a bar with a first end interconnected to an end of the pawl opposite the head of the pawl and a second end interconnected to the interior surface of the fairing; wherein the pawl slides along the toothed portions toward the first axial edge or the second axial edge of the fairing as the fairing breathes outward and the pawl locks on the toothed portions to limit the amount of inward displacement experienced by the fairing as the fairing breathes inward.

In one embodiment, a fairing is provided comprising: an interior surface; an exterior surface; a first axial edge; a second axial edge; an arcuate shape with a radius; an apex between the first axial edge and the second axial edge; and an apparatus for controlling a shape of the fairing following separation from a spacecraft, the apparatus comprising: a housing comprising: a first end; a second end; an interior chamber; a valve proximate the housing first end and in communication with the interior chamber; a piston disposed and movable within the interior chamber; and fluid positioned between the piston and the valve; and a rod having a first end and a second end, wherein the first end of the rod is interconnected to the piston and the second end of the rod extends out of the housing second end; a first mount interconnected to the fairing interior surface and the housing first end; a second mount interconnected to the fairing interior surface and the rod second end; wherein the valve permits fluid to enter the interior chamber of the housing such that the piston and rod can move away from the housing first end which allows the fairing to breathe outward following fairing separation, and wherein the valve limits fluid from exiting the housing such that when the fairing recoils inward during inward breathing the valve limits movement of the rod and, in turn, limits an inward breathing displacement of the fairing by increasing an inward breathing stiffness of the fairing.

For purposes of further disclosure, the following references generally related to mechanisms that changes the shape or stiffness of a structure, one-way locking mechanisms, and/or mechanisms for increasing fairing jettison clearance are hereby incorporated by reference in their entireties:

U.S. Pat. No. 8,187,006 to Rudisill et al. entitled "Flexible Magnetic Interconnects" discloses a magnetic interconnect that changes shape by movement of the magnetic structure;

U.S. Pat. No. 6,126,115 to Carrier et al. entitled "Apparatus for Retaining and Releasing a Payload" discloses a latch for a payload that uses temperature-activated shaped memory alloy (SMA) springs;

U.S. Pat. No. 9,180,982 to Baghdasarian entitled "Preload Releasing Fastener and Release System Using Same" discloses a preload reducing fastener with an integral collar adapted to change shape via the use of a shape memory alloy;

U.S. Pat. No. 6,920,966 to Buchele et al. entitled "Remotely Releasable Support Strut" discloses a support strut that uses an SMA and heat to change the shape of the part released such that a gap is created and the part is remotely releasable;

U.S. Pat. No. 9,303,484 to Storey et al. entitled "Dissolvable Subterranean Tool Locking Mechanism" discloses a locking mechanism that uses a SMA or a controlled electrolytic material (CEM) to change the shape of a part to release the locking mechanism;

U.S. Patent Publication No. 2015/0329224 to Sachdev et al. entitled "Payload Ejection System" discloses a payload ejection system with pins and hinges that allow motion in one direction but not other directions; and U.S. Pat. No. 6,781,284 to Pelrine et al. entitled "Electroactive Polymer Transducers and Actuators" discloses electroactive polymers to convert electric energy into mechanical energy and compliant electrodes that conform to the shape of a polymer.

For purposes of further disclosure, the following references generally related to dampers and are hereby incorporated by reference in their entireties:

U.S. Pat. No. 7,296,818 to Krumbeck et al. entitled "Combination of Ski and Ski Binding" discloses a damper for a ski binding; and U.S. Pat. No. 6,676,151 to Mangold et al. entitled "Ski or Snowboard Binding with Counterflex Damping of the Ski" discloses a damper for a ski or snowboard binding.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and, together with the general description of the invention given above and the detailed description of the drawings given below, serve to explain the principles of the invention.

The drawings are not necessarily to scale and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The orientation and directions as used herein are relative to the drawings as illustrated. Therefore, it should be appreciated that the terms "above," "below," "top," "bottom," "horizontal," or "vertical" are used to describe the relative location of different parts of the novel mechanism to alter the breathing stiffness and displacement and are intended to include not only a vertical or horizontal alignment. Specifically, following launch, the position of the spacecraft may no longer remain vertical but may have other orientations. Thus, the novel mechanism may be oriented differently in flight, but the relative position of the novel mechanism is as described.

Figure 1:
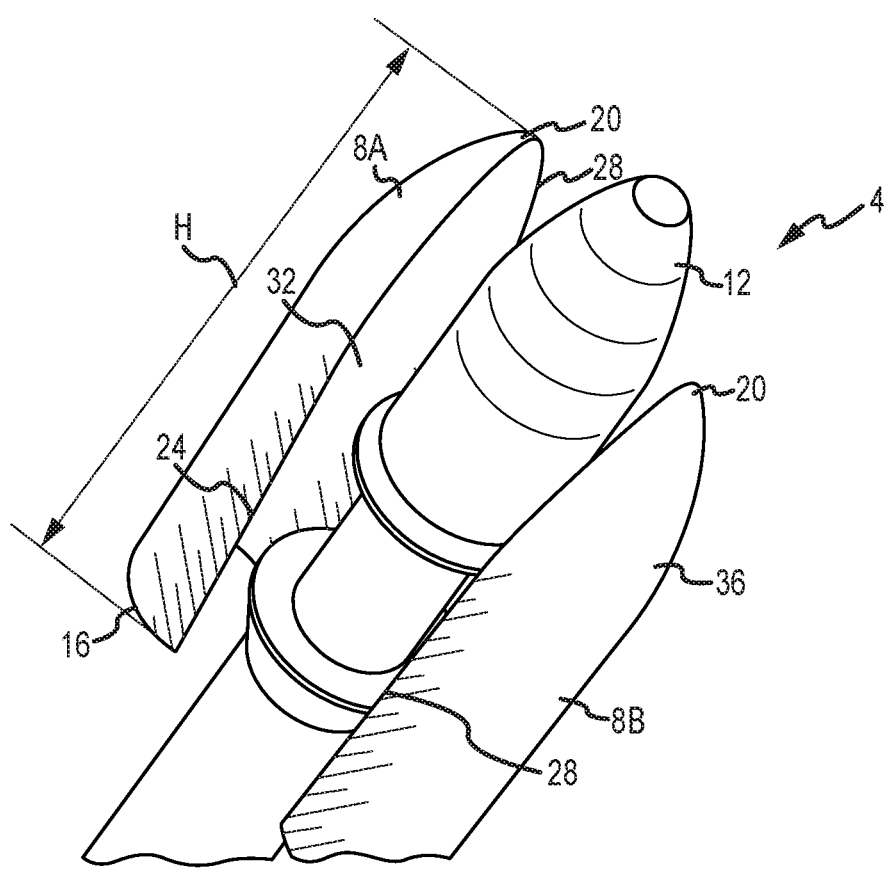
FIG. 1 is a perspective view of prior art fairings separating from the spacecraft.
Figure 2B:
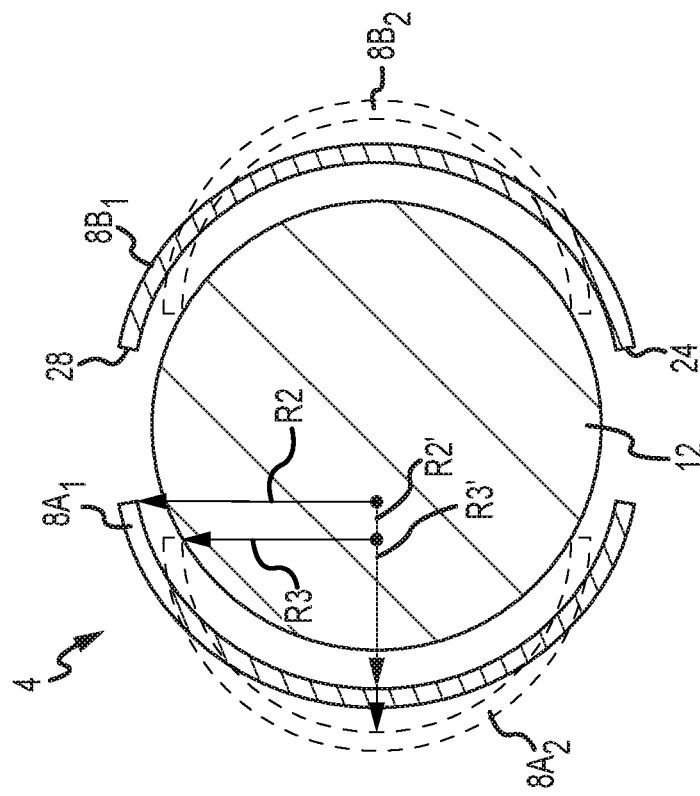
FIG. 2B is a cross-sectional view of the prior art fairings on the spacecraft as the fairings separate from the spacecraft (at time t1 and t2)
Figure 2A:
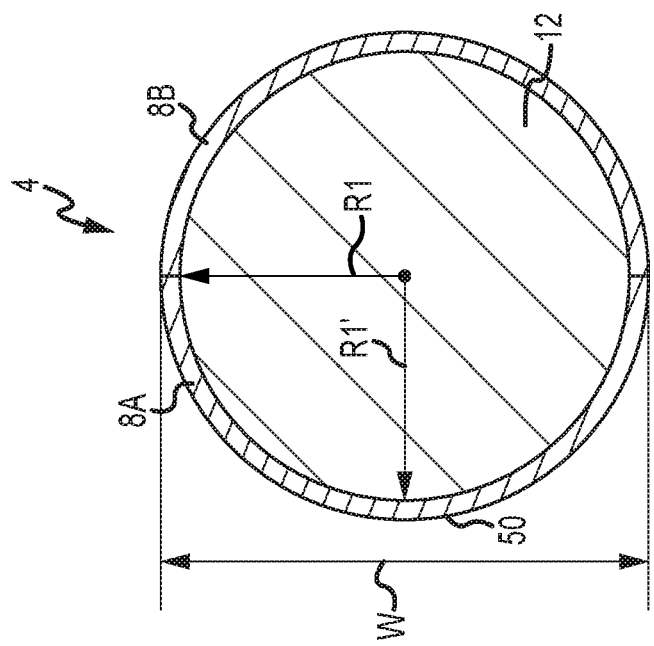
FIG. 2A is a cross-sectional view of the prior art fairings on the spacecraft before the fairing have separated (at time t0)
Figure 3A:
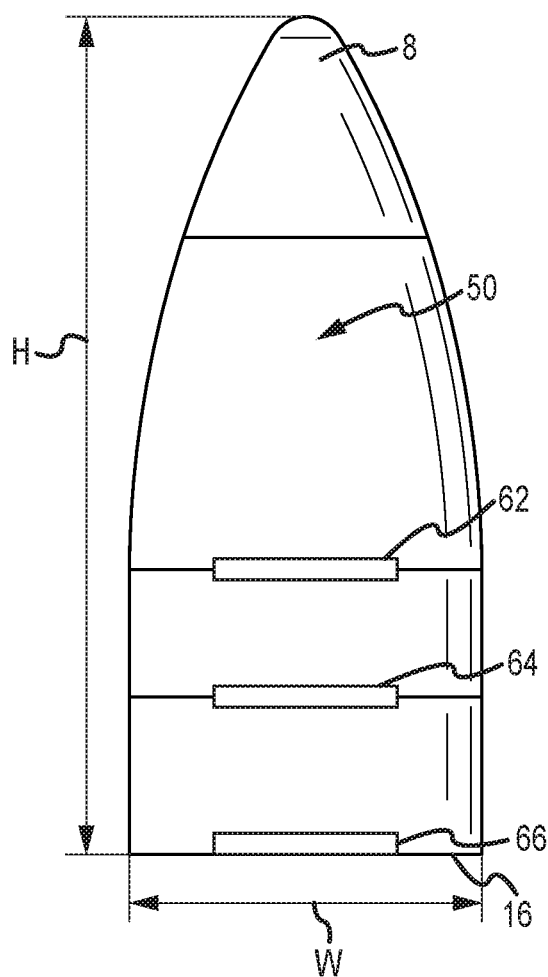
FIG. 3A is a front elevation view of a fairing showing possible locations of the mechanism for increasing jettison clearance according to various embodiments of the present invention.
Figure 3B:
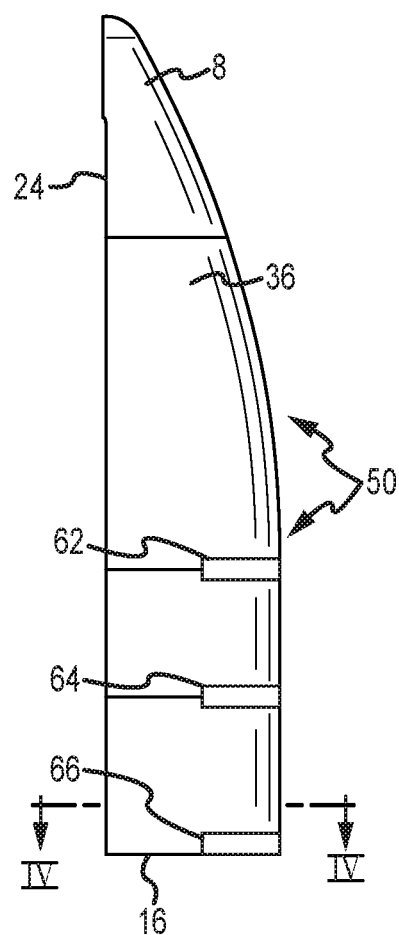
FIG. 3B is a side elevation view of the fairing with the mechanism of FIG. 3A.

FIG. 3A is a front elevation view of a fairing 8 showing possible locations of the mechanism for increasing jettison clearance and FIG. 3B is a side elevation view of the fairing 8 with the possible mechanism locations. The fairing 8 has a height H (measured from the bottom edge 16 to the tip) and a width W, which may also be the diameter from the first axial edge 24 to the second axial edge. The fairing 8 has an arcuate shape with an arc length, radius, radius of curvature, an interior surface, and an exterior surface 36. FIGS. 3A and 3B are exterior (outboard) views of the fairing 8 and the mechanism is typically located on an interior (inboard) surface of the fairing 8. Therefore, the mechanism locations 62, 64, 66 shown in FIGS. 3A-B merely show possible locations of the mechanisms on the fairing 8. In some embodiments, the mechanism is placed on the central section of the jettisoned structure that experiences the greatest amount of strain during separation. This area is generally the backbone region or apex 50. It is possible that the fairing 8 would include three mechanisms in the positions 62, 64, 66 shown or may only include one or two mechanisms in any of the locations 62, 64, 66 shown. Alternatively, the fairing 8 may have more than three mechanisms. The number of mechanisms used will depend on the stiffness of the fairing 8, the size and mass of the fairing 8, and the clearance needed between the fairing 8 and the spacecraft.

The mechanisms 70 shown in FIGS. 4A-10 are placed on the inboard surface 32 of the fairing 8 and are positioned proximate the apex or backbone region 50 of the fairing 8 at one or more of the locations 62, 64, 66 shown in FIGS. 3A-B. Alternatively, as shown in FIG. 11, a portion or all of the mechanism 70 can be placed on the outboard surface 36 of the fairing 8. Note that the mechanism 70 may be called an apparatus, an elongate member, or a band herein.

Figure 4A:
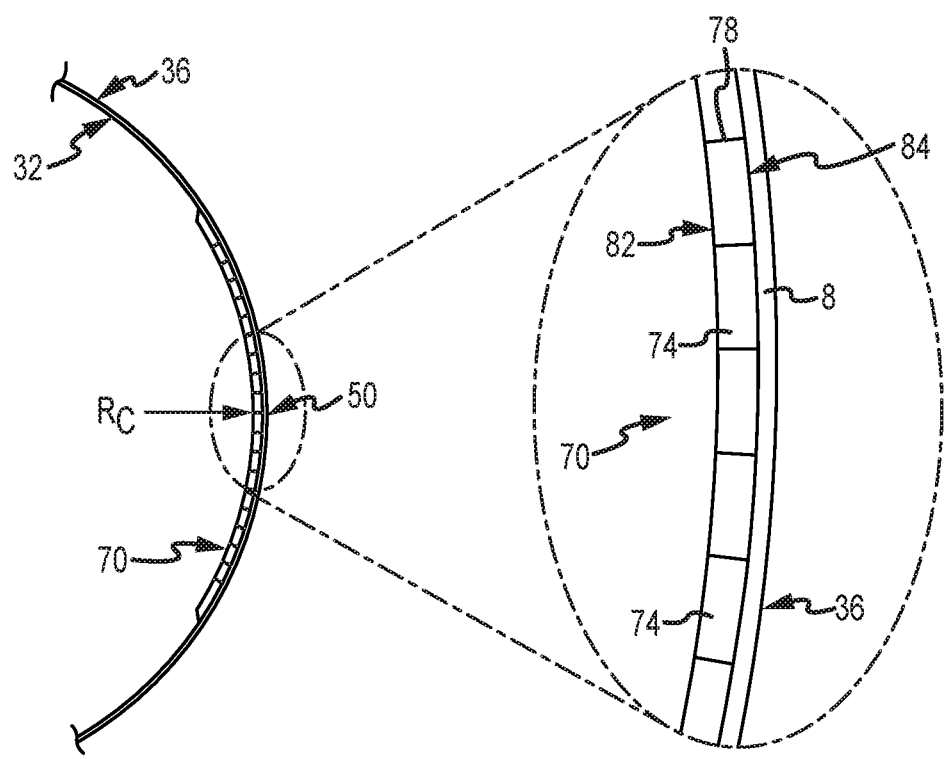
FIG. 4A is a cross-sectional view of the fairing and an embodiment of the mechanism taken along line IV-IV of FIG. 3B with an enlarged view of one section.

FIG. 4A is a cross-sectional view of the fairing 8 and mechanism 70 taken along line Iv-Iv of FIG. 3B with an enlarged view of one section. This is a simplified embodiment of a control mechanism 70 because it uses less components than other embodiments and specifically uses less components than the embodiment shown in FIGS. 5A-7B. The mechanism 70 includes a plurality of band portions 74, such that the mechanism 70 can separate between each band portion 74 (i.e., along the horizontal lines 78 shown) to allow outward expansion of the fairing 8 during outward flexing or breathing. The band portions 74 are interconnected to the interior surface 32 of the fairing 8 and positioned side-by-side in alignment such that their side surfaces touch the side surfaces of their neighboring band portions 74. The apparatus 70 is positioned in a horizontal plane (when the fairing is oriented as shown in FIGS. 3A-3B) such that the mechanism 70 is positioned along the arc length or radius of curvature of the fairing 8. In this embodiment, the majority of the apparatus 70 is positioned on the interior surface 32 of the fairing 8, except that fasteners may extend through the fairing 8 and have a portion positioned on the exterior surface 36 of the fairing 8. For example, if the fastener is a bolt, then the bolt head may be positioned on the exterior surface 36 of the fairing 8. This embodiment of the mechanism 70 does not alter the static form of the fairing 8. It does not lock the fairing 8 in a more open position during outward breathing, as is the case with other embodiments described herein. Rather, the band portions 70 increase the inward breathing stiffness of the fairing 8 to reduce the maximum inward breathing displacement of the jettisoned fairing 8 and, thus, reduce or eliminate the risk of spacecraft or vehicle damage during fairing 8 separation. Further, the radius of curvature $R_C$ of the portion of fairing with the mechanism 70 can increase as the fairing 8 separates from the spacecraft and breathes outward, but the mechanism prevents the radius of curvature $R_C$ of the portion of the fairing with the mechanism 70 from decreasing much beyond its original radius of curvature $R_C$ in its static, pre-separation state. The portion of the fairing with the mechanism 70 may deflect slightly past the original radius since the band or mechanism 70 is not infinitely rigid itself or in its attachment to the fairing. However, displacement past the original shape will be greatly reduced and minimized compared to a fairing without the mechanism 70. The number and size of the band portions 70 depends on the mass and stiffness of the fairing 8, the amount of separation energy imparted into the fairing, and the amount of clearance needed based on the size of the payload or spacecraft.

In alternative embodiments, the mechanism 70 is one long elongate member with slits 78 cut along the elongate member, where the slits 78 extend through the elongate member from the first edge 82 (i.e., the edge 82 opposite the fairing) to a second edge 84 (i.e., the edge 84 adjacent the fairing 8). The edges 82, 84 may be called sides or side surfaces herein. In other embodiments, the elongate member has an accordion shape and bolts with springs extend through the accordion-shaped elongate member and through the fairing.

Figure 4B:
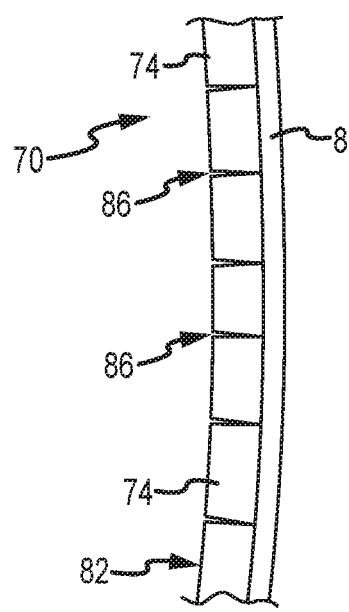
FIG. 4B is the enlarged view of FIG. 4A as the fairing breathes outward and the band portions of the mechanism separate.

FIG. 4B shows the apparatus 70 of FIG. 4A at a time when the fairing 8 is breathing outwardly. Here the elongate member or band portion 74 have separated along the separation lines 78 forming gaps 86. The separation lines 78 and gaps 86 allow the fairing to breathe or flex outward such that the apparatus 70 does not hinder or restrict the outward breathing or flexing of the fairing 8.

Figure 5A:
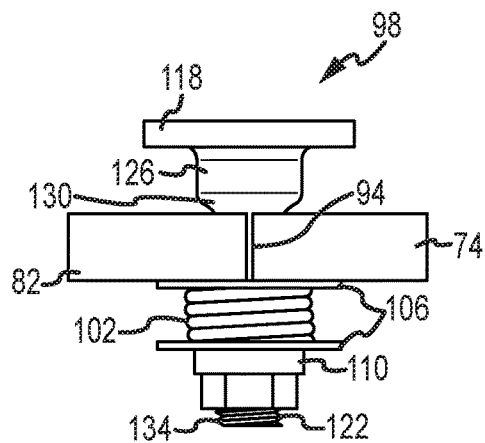
FIG. 5A is a front elevation view of a second embodiment of the mechanism for increasing jettison clearance before the fairing has been jettisoned from the spacecraft.
Figure 5B:
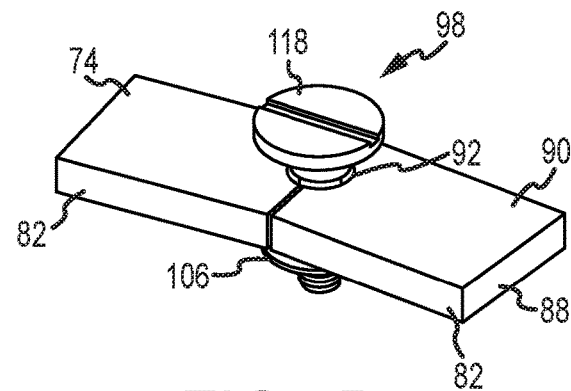
FIG. 5B is a top perspective view of the mechanism of FIG. 5A before the fairing has been jettisoned from the spacecraft.

FIG. 5A is a front elevation view of a second embodiment of one portion of a mechanism for increasing jettison clearance before the structure or fairing has been jettisoned from the vehicle or spacecraft and FIG. 5B is a top perspective view of the portion of the mechanism. The mechanism is comprised of a plurality of band portions 74 positioned side-by-side, as shown in FIG. 4A. In this embodiment, each portion of the mechanism includes a band portion 74. The band portion 74 has an interior surface (also called inboard surface, side, or first edge) 82, an outboard surface (also called exterior surface, side, or second edge, not shown) 84 positioned adjacent the fairing, two side surfaces 88 (also called a side herein), and upper surface 90, and a bottom surface (not shown). The band portion 74 has an aperture 92 proximate the center of the band portion 74 and a slit (also called a slot herein) 94 extending from the second edge or rear surface 84 proximate the fairing to the interior surface or first edge 82 of the band portion 74 and extending through the aperture 92. In other embodiments, the slit 94 extends from the aperture 92 to the interior surface (also called the first edge or side) 82 of the band portion 74. The mechanism also includes a blocking member 98 (which can be a pin, spring-loaded pin, cam, or wedge) having a biasing member 102 (which can be a spring or other force-exerting mechanism), one or more washers (also called plates) 106, and a locking mechanism or platform 110 (which can be a nut). The pin 98 has a head (also called head portion) 118, cylindrical portion (also called second body portion) 122 opposite the head portion 118, and an enlarged portion (also called thick cylindrical portion) 126 positioned between the head 118 and the cylindrical portion 122. The enlarged portion 126 may optionally include a tapered surface 130 proximate to and tapering into the cylindrical body portion 122 and proximate the band portion 74 in the non-deployed position. At least a portion of the cylindrical portion 122 has threads 134 to threadingly engage a threaded inner threaded surface of the locking mechanism or nut 110. The nut 110 is adjustable to adjust the amount of tension on the biasing member 102 and blocking member 98.

The band portions 74 may be longer, shorter, thicker, and/or wider than the band portion 74 shown in FIGS. 5A-7B. Alternatively, the mechanism 70 could be one or several long bands with multiple apertures 92 and blocking members 98 in a single band rather than a plurality of band portions 74.

At time t0, before the structure is jettisoned, the biasing member 102 is in compression and the enlarged cylindrical portion 126 of the pin 98 is positioned above the upper surface 90 of the band portion 74. The aperture 92 in the band portion 74 is sized to fit the cylindrical body portion 122 of the pin 98, but is smaller than the enlarged portion 126 of the pin 98. Thus, the enlarged cylindrical portion 126 cannot fit in the aperture 92. The spring 102 is positioned between two plates 106 and around the cylindrical portion 122 of the pin 98 below the band portion 74. One washer 106 is positioned between the band portion 74 and the biasing member 102. Another washer 106 is positioned between the biasing member 102 and the locking mechanism 110. The washers 106 help to evenly distribute the force of the spring 102 on both the nut 110 and the band portion 74. The nut 110 is positioned around the lower portion of the cylindrical body portion 122—and specifically around the threaded portion 134 of the cylindrical body portion 122. In other embodiments, devices other than a threaded shaft 134 and ring 110 could be used. For example, the blocking member 98 and biasing member 102 could include a cotter key, cotter pin, or other structures known to those skilled in the art.

Each side surface 88 of the band portion 74 is positioned adjacent to a side surface 88 of another band portion 74, unless the band portion 74 is the endmost band portion 74 in the plurality of band portions 74. The number and size of the band portions 74 is dependent on the system deflections, the stiffness and mass of the fairing, and the clearance needed by the system. The second edge (also called a side or rear surface) 84 of the band portion 74 is positioned proximate to the inboard surface of the fairing. In some embodiments, the second edge 84 of the band portion 74 may be positioned adjacent to and touching the inboard surface of the fairing.

Figure 6A:
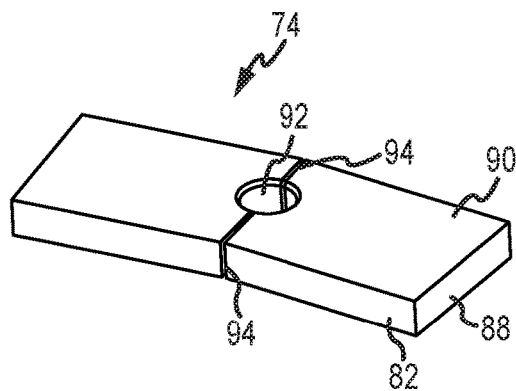
FIG. 6A is a top perspective view of the band portion of the mechanism of FIGS. 5A-B before the fairing has been jettisoned from the spacecraft.
Figure 6B:
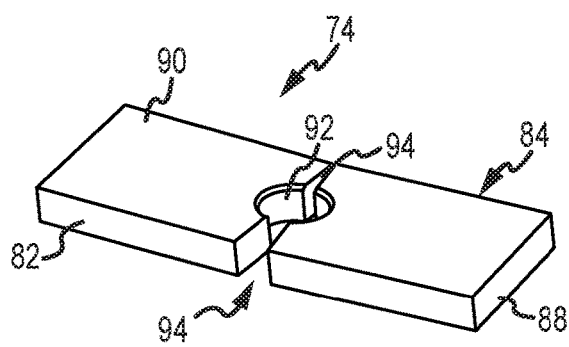
FIG. 6B is a top perspective view of the band portion of the mechanism of FIGS. 5A-B after the fairing has been jettisoned from the spacecraft.

FIG. 6A is a top perspective view of the band portion 74 of the mechanism at time t0, before the fairing has been jettisoned from the spacecraft. After the fairings separate from the spacecraft and as the fairings jettison away from the spacecraft, the fairings breathe or flex outward. As the fairings breathe or flex outward, the band portion 74 separates along the slot 94, which increases the size of both the aperture 92 and the slot 94. FIG. 6B is a top perspective view of the band portion 74 of the mechanism at time t1, after the fairing has been jettisoned from the spacecraft and as the slit 94 separates and the aperture 92 opens.

Figure 7A:
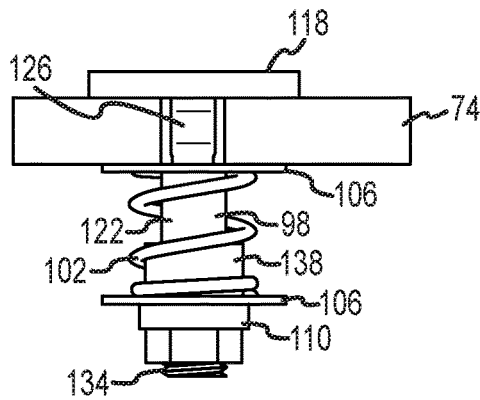
FIG. 7A is a front elevation view of the mechanism of FIGS. 5A-B after the fairing has been jettisoned from the spacecraft.
Figure 7B:
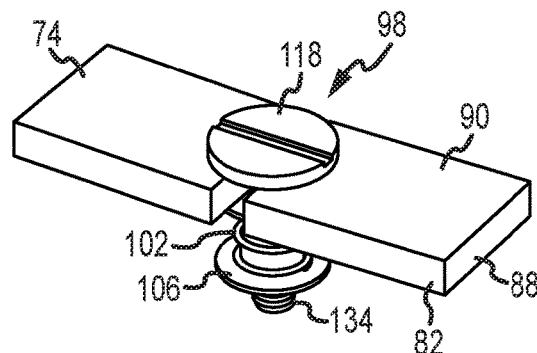
FIG. 7B is a top perspective view of the mechanism of FIG. 7A after the fairing has been jettisoned from the spacecraft.

Once the aperture 92 is at least the size of the enlarged cylindrical portion 126 of the pin 98, the enlarged cylindrical portion 126 is pulled by the biasing member 102) into the now-larger aperture 92. This is shown in FIGS. 7A and 7B. FIG. 7A is a front elevation view of the portion of the mechanism of FIGS. 5A-B after the fairing has been jettisoned from the spacecraft and FIG. 7B is a top perspective view of the portion of the mechanism. Once the enlarged portion 126 has moved to its deployed position, the enlarged portion 126 prevents the aperture 92 and slit 94 from closing and returning to their original shapes, thus changing the fairing's static form to be in a more open position and also increasing the inward breathing stiffness of the fairing to limit the amount the fairing can recoil or breathe inward. Additionally, the biasing member 102 prevents the thick cylindrical portion 126 from being forced out of the aperture 92.

In some embodiments, the pin 98 is a screw. Alternatively, the pin 98 can be a rivet, wedge, or shim. In other embodiments, the pin 98 is a custom-shaped pin 98 with a head portion 118. The pin 98 can be metal, composite material, ceramic, or any other material known in the art. The band portion 74 can be metal, composite material, ceramic, or any other material known in the art. Additionally, the aperture 92 and pin 98 may have a different shape, e.g., square, rectangular, oval, etc. Any type of nut 110 and/or washer 106 can be used in various embodiments, including a one-piece nut and washer. A bushing 138 is positioned around the cylindrical body portion 122 of the pin 98. The bushing 138 prevents over compressing the spring, sets the spring preload, and provides for some nominal preload in the joint to prevent the entire pin assembly or component from moving or rattling during ascent.

Figure 8:
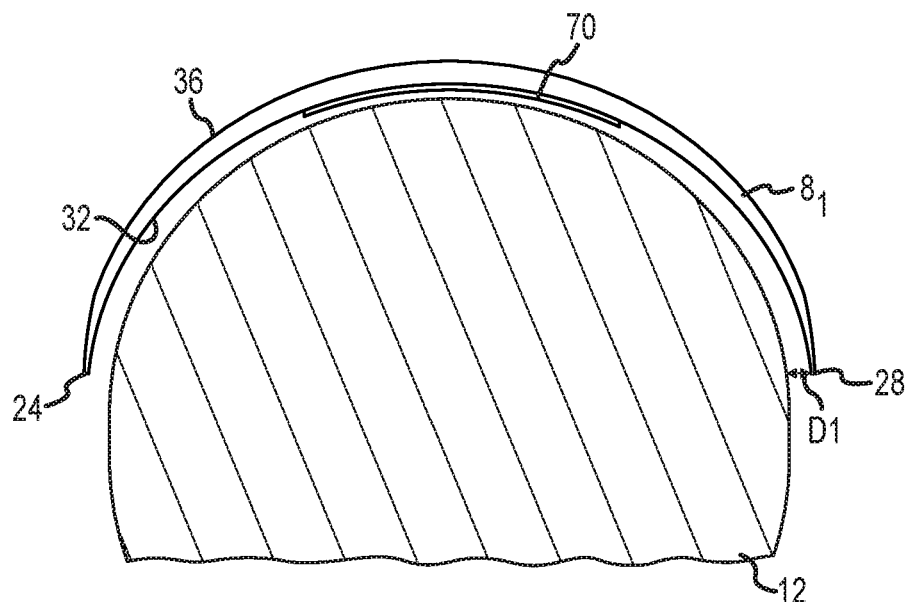
FIG. 8 is a cross-sectional view of a spacecraft and a fairing with any of the embodiments of the mechanism for increasing jettison clearance provided herein immediately after the fairing has separated from the spacecraft (time t1) and this view is taken at the same IV-IV cut location of FIG. 3B.

FIG. 8 is a simplified cross-sectional view of the spacecraft 12 and fairing $8_1$ with an embodiment of the mechanism 70 for increasing jettison clearance immediately after the fairing $8_1$ has separated from the spacecraft (time t1). This cross-sectional view is taken at the same IV-IV cut location of FIG. 3B. The mechanism 70 shown in FIGS. 8-10 can be any of the mechanism embodiments provided herein. For illustrative purposes, two fairings $8_1$ are shown in FIG. 8: one fairing with the mechanism 70 for increasing jettison clearance and one fairing without a mechanism. The mechanism 70 has a band portion 74 directly interconnected to the interior surface 32 of the fairing 8. However, at this time (t1) only one fairing $8_1$ can be seen because the fairings $8_1$ are positioned in the same location and are just beginning to flex or breathe outward. The axial edges 24, 28 of the fairings $8_1$ are a distance D1 away from the spacecraft 12. The mechanism 70 in this embodiment may be similar to the mechanism 70 shown in FIGS. 4A-7B with band portions 74.

Figure 9:
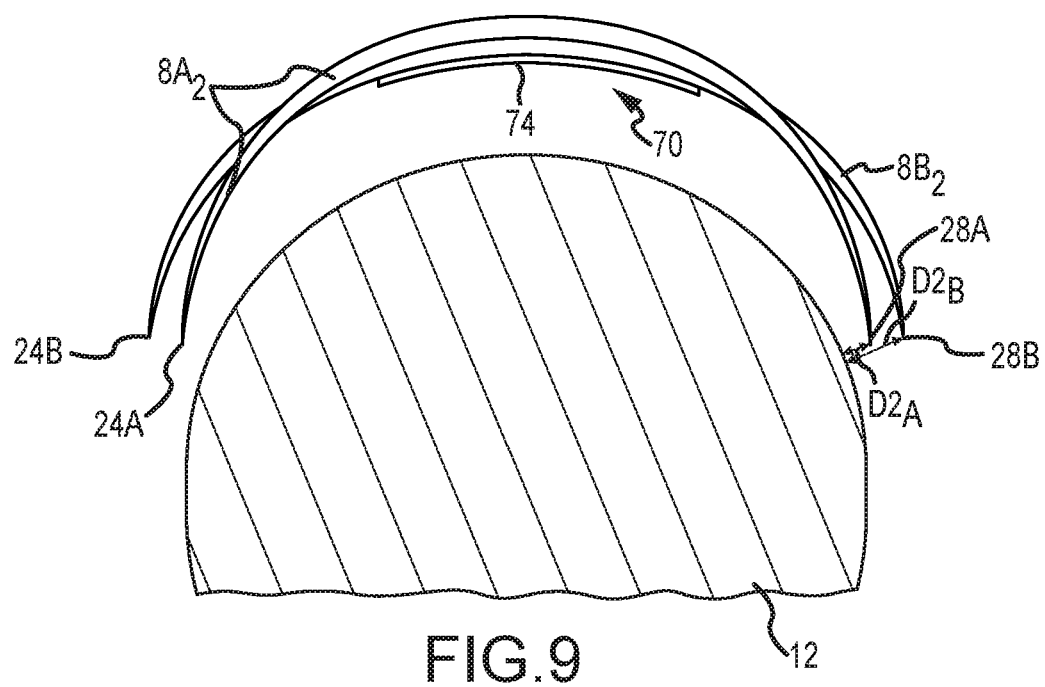
FIG. 9 is a cross-sectional view of the spacecraft and fairing of FIG. 8 and a fairing without the mechanism for increasing jettison clearance at a time shortly after FIG. 8 (i.e., at time t2)
Figure 10:
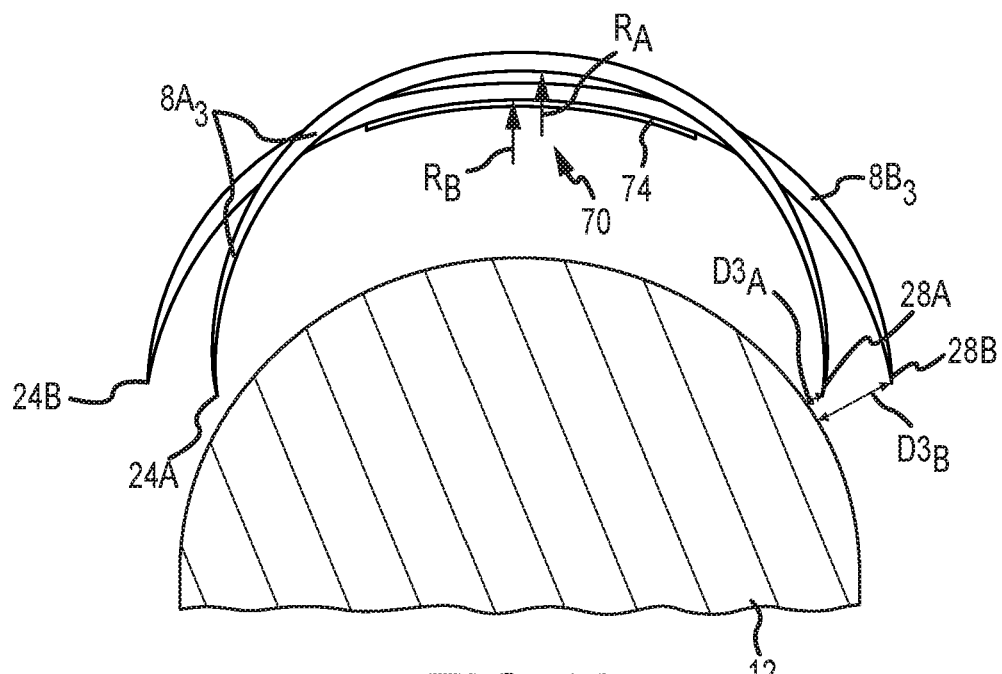
FIG. 10 is a cross-sectional view of the spacecraft and fairings of FIGS. 8-9 at a time shortly after FIG. 9 (i.e., at time t3)
Figure 11:
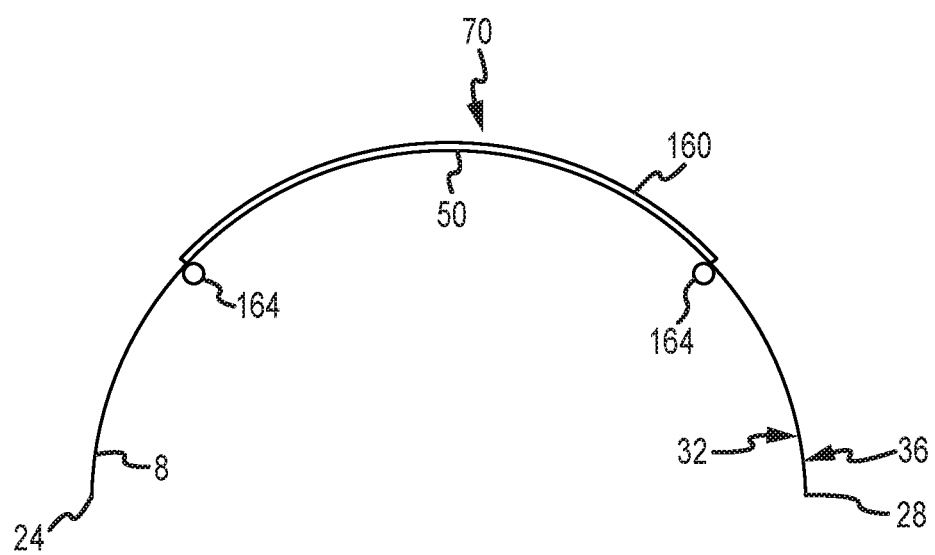
FIG. 11 is a cross-sectional view of a fairing with a fourth embodiment of the mechanism for increasing jettison clearance and this view is taken at the same IV-IV cut location of FIG. 3B.

For FIGS. 9-10, the fairing 8A without the mechanism 70 has a first axial edge 24A and second axial edge 28A and the fairing 8B with the mechanism 70 has a first axial edge 24B and second axial edge 28B.

FIG. 9 is a cross-sectional view of the spacecraft 12 and fairings $8A_2$, $8B_2$ of FIG. 8 at time t2, a time shortly after FIG. 8. At this time, both fairings $8A_2$, $8B_2$ are flexing outward before recoiling from that expansion. The fairing $8A_2$ without the mechanism 70 is done breathing outward and is about to begin breathing inward and the fairing $8B_2$ with the mechanism 70 continues to breathe outward. Thus, the axial edge 28A of the fairing $8A_2$ without the mechanism 70 is a distance $D2_A$ away from the spacecraft 12 and the axial edge 28B of the fairing $8B_2$ with the mechanism 70 is a distance $D2_B$ away from the spacecraft 12. The distance $D2_A$ is less than the distance $D2_B$.

FIG. 10 is a cross-sectional view of the spacecraft 12 and fairings $8A_3$, $8B_3$ of FIGS. 8-9 shortly after FIG. 9 (i.e., at time t3). At this time, the fairing $8A_3$ without the mechanism 70 breathes inward while the fairing $8B_3$ with the mechanism 70 remains in its outward breathing position. Accordingly, the new static position of the fairing $8B_3$ with the mechanism 70 is the position shown in FIG. 10. The axial edge 28A of the fairing $8A_3$ without the mechanism 70 is a distance $D3_A$ away from the spacecraft 12 and the axial edge 28B of the fairing $8B_3$ with the mechanism 70 is a distance $D3_B$ away from the spacecraft 12. The distance $D3_A$ is much less than the distance $D3_B$. Thus, the fairing $8B_3$ with the mechanism 70 breathes inward less than the fairing $8A_3$ without the mechanism 70 because the mechanism 70 creates nonlinear stiffness characteristics, meaning the fairing 8 is softer breathing outward and stiffer breathing inward. Further the radius of curvature $R_A$ of the portion of fairing $8A_3$ proximate the apex for the fairing $8A_3$ without the mechanism 70 is smaller than the radius of curvature RB of the portion of the fairing $8B_3$ with the mechanism 70. Thus, the mechanism of the present invention prevents the radius of curvature of the fairing proximate the apex from decreasing below a certain radius of curvature, but the mechanism of the present invention does not prevent the radius of curvature of the fairing proximate the apex from increasing as the fairing breathes outward. For embodiments with the mechanism 70, the radius of curvature can enlarge upon outward deflection (outward breathing), but the radius of curvature cannot decrease much below a predetermined radius of curvature. The predetermined radius of curvature is either the static, pre-separation radius of curvature or the enlarged and locked open radius of curvature. The radius of curvature may decrease slightly below the predetermined radius of curvature because the mechanism 70 is not infinitely rigid itself or in its attachment to the fairing.

FIG. 11 is a cross-sectional view of the fairing 8 with a fourth embodiment of the mechanism 70 for increasing jettison clearance and this view is taken at the same Iv-Iv cut location of FIG. 3B. This embodiment of the novel mechanism uses a spring-tensioned webbing or strap 160 on the outboard surface 36 of the structure (e.g., fairing 8) and each end of the strap 160 is in tension with a torsion spring housed in an inertia reel 164. The inertia reels 164 are positioned on the inboard surface 32 of the fairing 8. As the fairing 8 initially flexes or breathes outward after jettison, the inertia reels 164 move closer together and the ends of the strap 160 are retracted into the inertial reels 164. As the fairing 8 breathes inward, the inertial reels 164 lock the webbing or strap 160 in a new, shorter length which prevents inward breathing of the fairing 8. This changes both the static form of the jettisoned fairing 8 and the inward breathing stiffness of the fairing 8.

In alternative embodiments of the mechanism 70 shown in FIG. 11, the fairing 8 could include two mechanisms 70 positioned at the same height on the fairing and separated a distance from each other. One mechanism 70 could be positioned proximate the first axial edge 24 and the other mechanism 70 could be positioned proximate the second axial edge 28 such that there is no mechanism on the spine of the fairing 8. Further, each mechanism 70 could include an inertia reel 164 on either end of the strap 160. Alternatively, each mechanism 70 may only have one inertial reel 164 on the end of the strap 160 proximate the spine 50 of the fairing 8.

Figure 12:
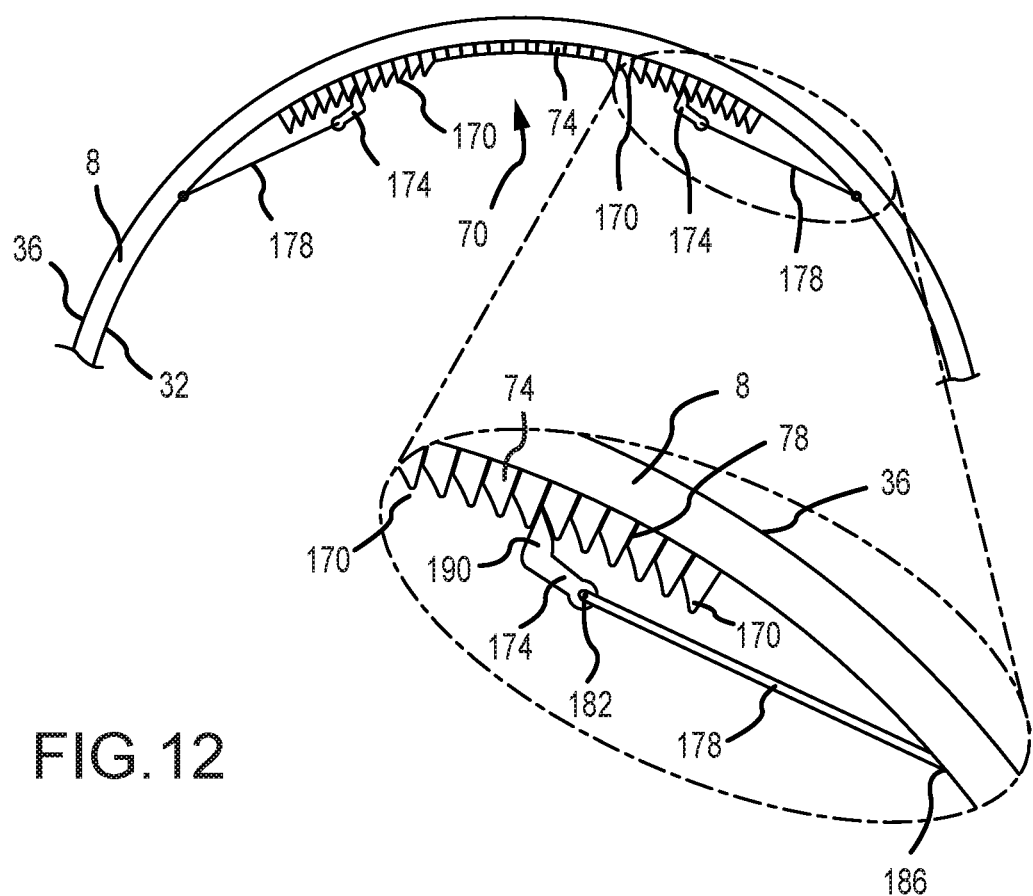
FIG. 12 is a cross-sectional view of a fairing with a fifth embodiment of the mechanism for increasing jettison clearance with an enlarged view of one section.

A fifth embodiment of the novel mechanism 70 is shown in FIG. 12. This embodiment includes a band with band portions 74 positioned on the inboard surface 32 of the fairing 8 proximate the apex 50 of the fairing 8 at one or more of the locations shown in FIGS. 3A-B. Some band portions 74 have teeth 170 extending inwardly and away from the fairing 8. In the embodiment shown, the band portions 74 proximate the edges of the band have teeth 170.

The mechanism 70 also includes a pawl 174. The rear end of the pawl 174 is interconnected to one end of a link (also called a linking member herein) 178 at an interconnection point 182. The other end 186 of the link 178 is interconnected to the interior surface 32 of the fairing 8. The pawl 174 has a head 190 opposite its rear end, where the head 190 is adapted to engage with the teeth 170 of the band portion 74. Thus, the band portion 74 with teeth 170 acts like a ratchet when engaging the pawl 174. In this embodiment, as the fairing 8 breathes outward during jettison, the head 190 of the pawl 174 slides past the teeth 170. As the fairing 8 starts to breathe inward, the pawl 174 catches on the teeth 170 and locks to lock the fairing 8 in a more open position and prevent or limit the fairing's inward displacement during inward breathing. Thus, this embodiment changes both the static form of the jettisoned fairing 8 and the inward breathing stiffness of the fairing 8.

Figure 13:
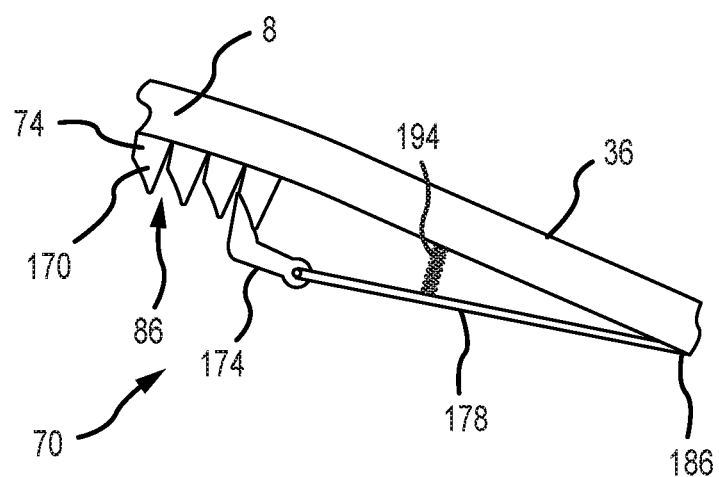
FIG. 13 is the enlarged view of FIG. 12 as the fairing breathes outward and the band portions separate and the ratchet or pawl locks on the teeth of the band portions.

FIG. 13 shows the enlarged portion of FIG. 12 but after the fairing 8 has separated from the launch vehicle or spacecraft. Additionally, the fairing has breathed outward and the pawl 174 has moved along the teeth 170 toward the end of the teeth 170. When the fairing 8 is done breathing outward and begins to breathe inward, the pawl 174 is locked in place in a different position than it was originally in, which, in combination with the link 178, locks the fairing 8 in a more open position. Additionally, the mechanism 70 would also include springs or other biasing members 194 to bias the pawl 174 toward the teeth 170 (and, thus, toward the fairing 8) and to prevent the pawl 174 from moving inboard radially or moving away from the teeth 170 in any direction. The springs or biasing members 194 may be positioned in other locations than that shown in FIG. 13. For example, the springs or biasing members 194 may be positioned above or below the mechanism 70.

An alternative embodiment of the mechanism 200 includes a damper with a hydraulic or pneumatic cylinder. FIGS. 14-19 show the mechanism being a damper 200.

Figure 14:
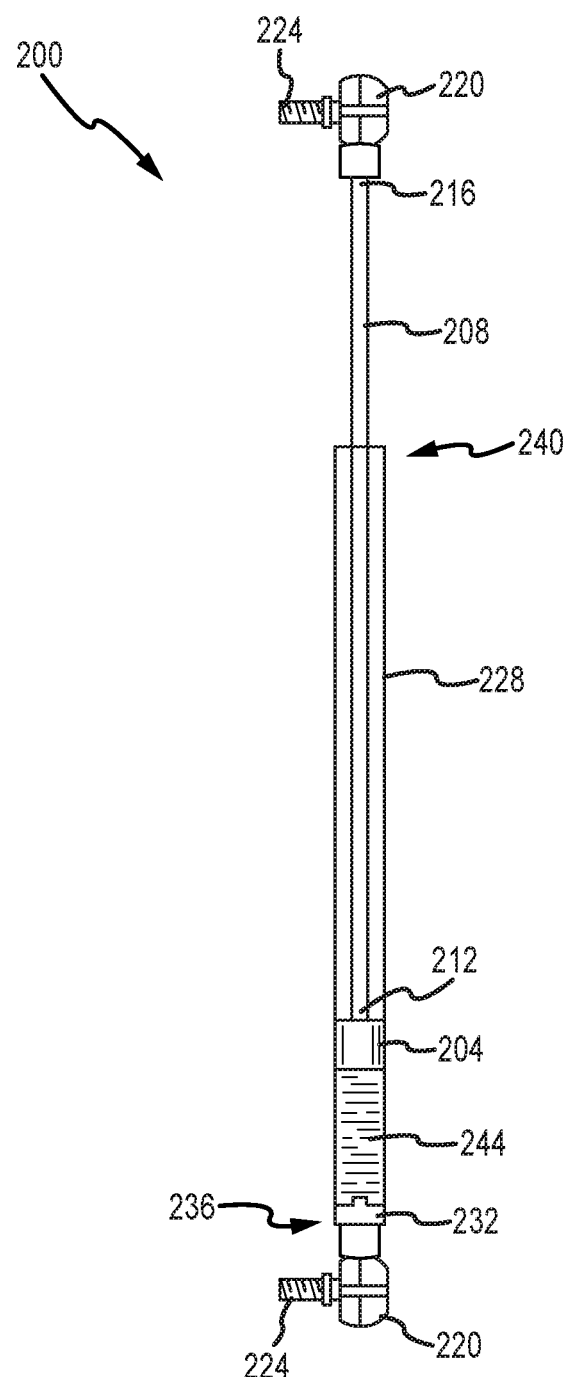
FIG. 14 shows a sixth embodiment of the mechanism for increasing jettison clearance.

FIG. 14 shows a damper 200, which can be used as the mechanism for increasing jettison clearance. The components within the damper housing are shown for clarity and discussion purposes. Typically, the components within the damper housing would not be visible. The damper 200 has a piston 204 and a rod 208 is interconnected to the piston 204 on a first end 212, where the second end 216 of the rod 208 is interconnected to the interior surface of the fairing via a mount 220 and a fastening device 224. The fastening device may be a bolt, screw, clevis, or any other known fastening device. The damper 200 has a housing 228 with a valve 232 on a first end 236 and the rod 208 interconnected to the piston 204 exits the housing 228 on the housing's second end 240 opposite the first end 236. In one embodiment, the valve 232 is a one-way valve. In some embodiments, the housing 228 has a cylindrical shape. In the damper's 200 static state before fairing separation (FIGS. 14, 16, and 18), the piston 204 is mostly in the housing 228 and is positioned proximate the housing first end 236 with the valve 232. As the fairing breathes outward, the piston 204 is pulled away from the valve 232 and toward the second end 240 of the housing 228. The housing 228 fills with fluid 244 that enters through the valve 232 as the piston 204 is pulled away from the valve 232 and toward the second end 240 of the housing 228. When the fairing begins to breathe inward, the damper 200 restricts motion of the piston 204 in an inward direction, which restrains the fairing motion, because the fluid now in the damper cannot exit through the valve 232 or can only exit the valve 232 very slowly. Thus, the fairing is restrained in a more open position by the damper 200.

Figure 15:
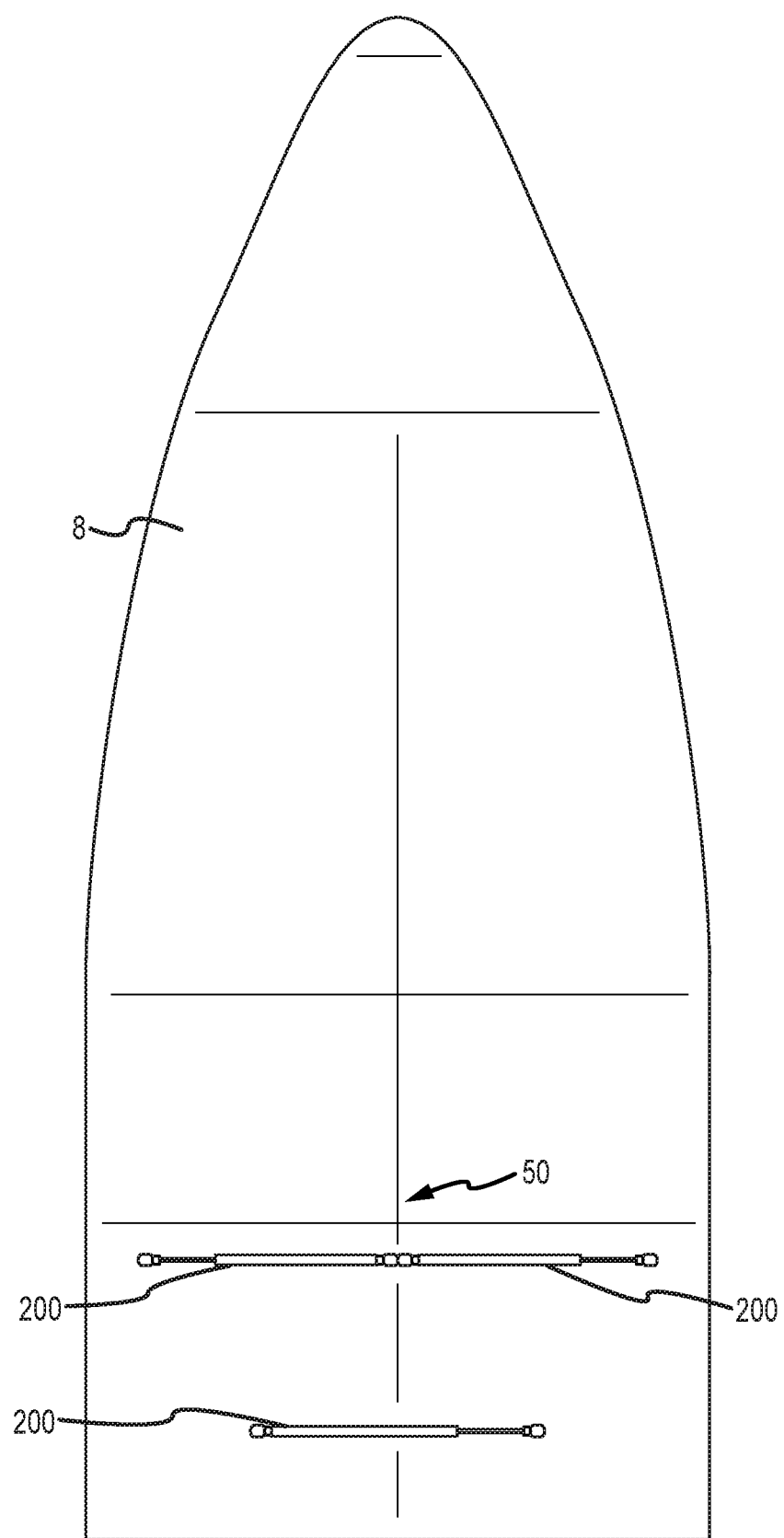
FIG. 15 is a front elevation view of a mechanism for increasing jettison clearance positioned on the fairing.

FIG. 15 is a front elevation view of a fairing 8 showing some of the possible locations of the mechanism for increasing jettison clearance 200. FIG. 15 is an interior view (looking outboard) of the fairing 8 because the mechanism 200 is typically located on an interior (inboard) surface of the fairing 8. Therefore, the mechanism locations shown in FIG. 15 merely show possible locations of the mechanisms on the fairing 8. In some embodiments, the mechanism 200 is placed on the central section of the jettisoned structure that experiences the greatest amount of strain during separation. This area is generally the backbone region or apex 50.

The fairing 8 can include any number of mechanisms 200. If the fairing 8 only includes one mechanism 200 in a specific horizontal plane, then the mechanism 200 can be centered on the backbone region 50 of the fairing 8 as shown in FIG. 15. If the fairing 8 includes two mechanisms 200 in a specific horizontal plane, then the mechanisms 200 may be interconnected to the fairing 8 such that one end of each mechanism 200 is positioned on the backbone region 50, as shown in FIG. 15. The fairing 8 could include all three mechanisms 200 as shown in FIG. 15, or could include more or fewer mechanisms in various locations and orientations. The number of mechanisms 200 used will depend on the stiffness of the fairing 8, the size and mass of the fairing 8, and the clearance needed between the fairing 8 and the spacecraft. Thus, in some embodiments, more than one damper 200 can be used. The dampers 200 may be positioned in line with one another (i.e., in the same plane) or the dampers 200 may be positioned above and below one another. The dampers 200 may also cross over one another depending on the number of dampers 200 desired.

Figure 16:
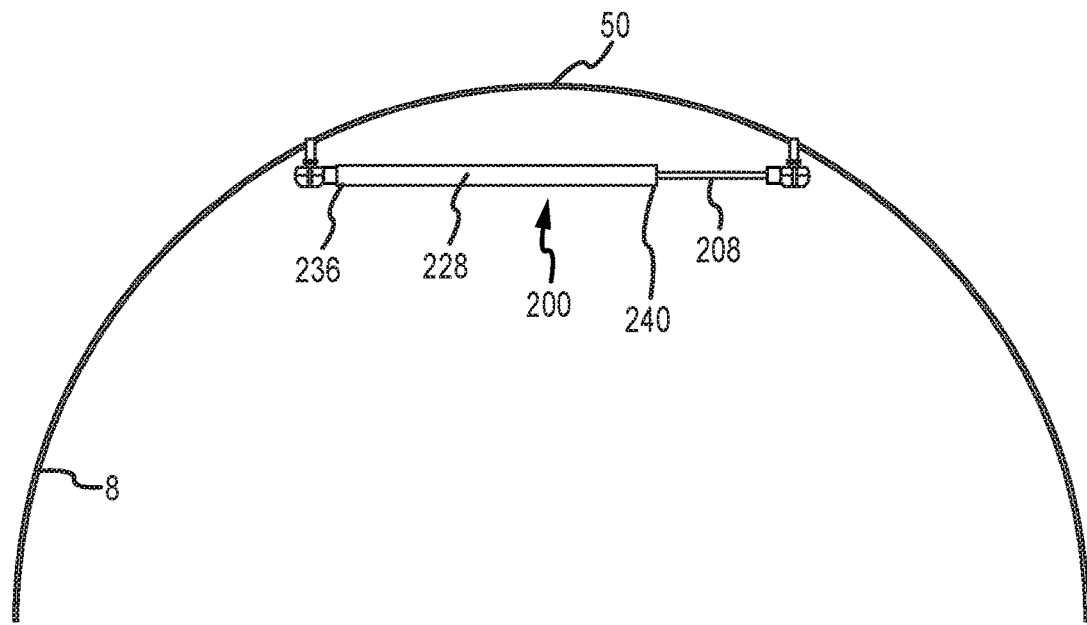
FIG. 16 is a cross-sectional view of a fairing with a sixth embodiment of the mechanism for increasing jettison clearance shown before the fairing has been jettisoned from the spacecraft (time=t0)

FIG. 16 is a cross-sectional view of a fairing 8 with one damper 200 shown before the fairing 8 has been jettisoned from the spacecraft (i.e., at time=t0). The damper 200 is interconnected to the interior surface of the fairing 8. The damper 200 may be interconnected to the fairing 8 via fastening means such as bolts, screws, devises, or spherical bearings. For example, the damper 200 could bolt onto the interior surface of the fairing 8 and be attached with some sort of spherical bearing or clevis attachment, such that the fairing 8 can freely breathe outward. Here, at time t0, the damper 200 is in its static state. Also at this time, the piston is positioned proximate the housing first end 236 and proximate the valve.

Figure 17:
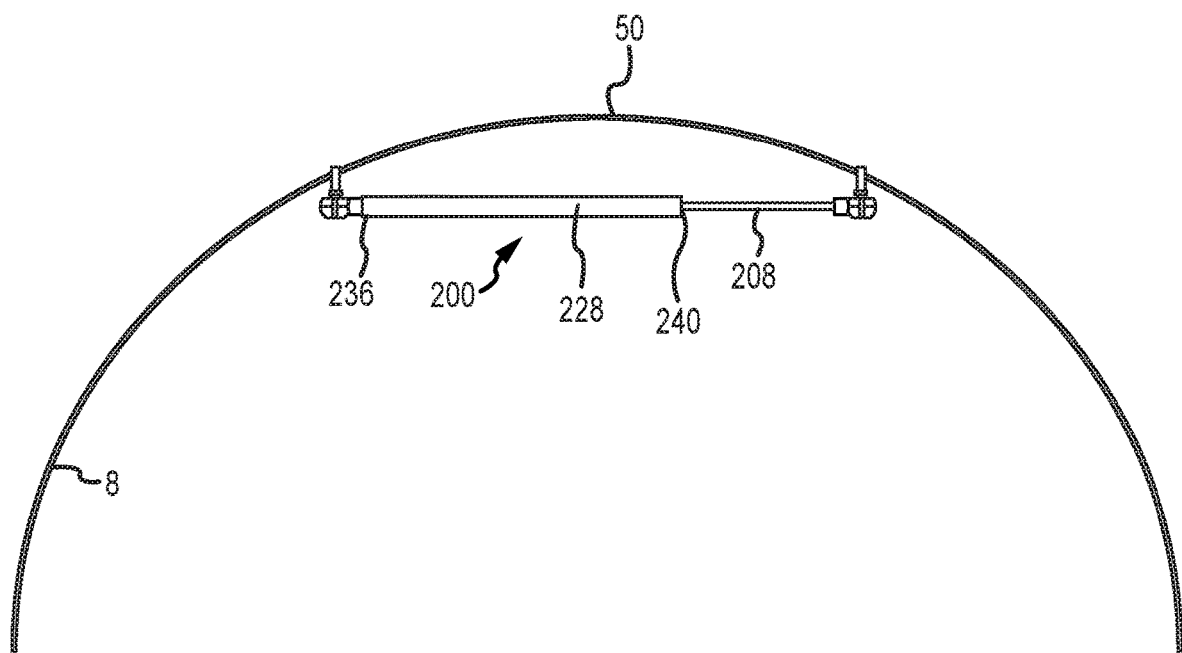
FIG. 17 is a cross-sectional view of the fairing and mechanism for increasing jettison clearance of FIG. 16 shown after the fairing has been jettisoned from the spacecraft (time=t1)

FIG. 17 is a cross-sectional view of the fairing 8 and damper 200 of FIG. 16 shown after the fairing has been jettisoned from the spacecraft (i.e., at time=t1). At this point in time the fairing 8 is breathing outward. The damper 200 is set such that it is very underdamped, or not damped at all, for movement in the expansion or extending direction such that the damper 200 does not inhibit the fairing 8 from breathing outward. Thus, the piston can freely move away from the housing first end 236 and toward the housing second end 240. As the piston moves toward the housing second end 240, the rod 208 moves out of the housing 228 such that more of the rod 208 is out of the housing 228 than at time t0.

The damper 200 limits the amount the fairing 8 can breathe inward because it is very overdamped in the compression direction, meaning the damper 200 prevents or slows the piston from moving back toward the housing first end 236 and, thus, prevents the rod 208 from moving back into the housing 228. Therefore, the rod 208 remains extended, which prevents or limits the portion of the fairing 8 interconnected to the damper 200 from breathing inward and limits the amount the fairing can breathe inward overall.

Figure 18:
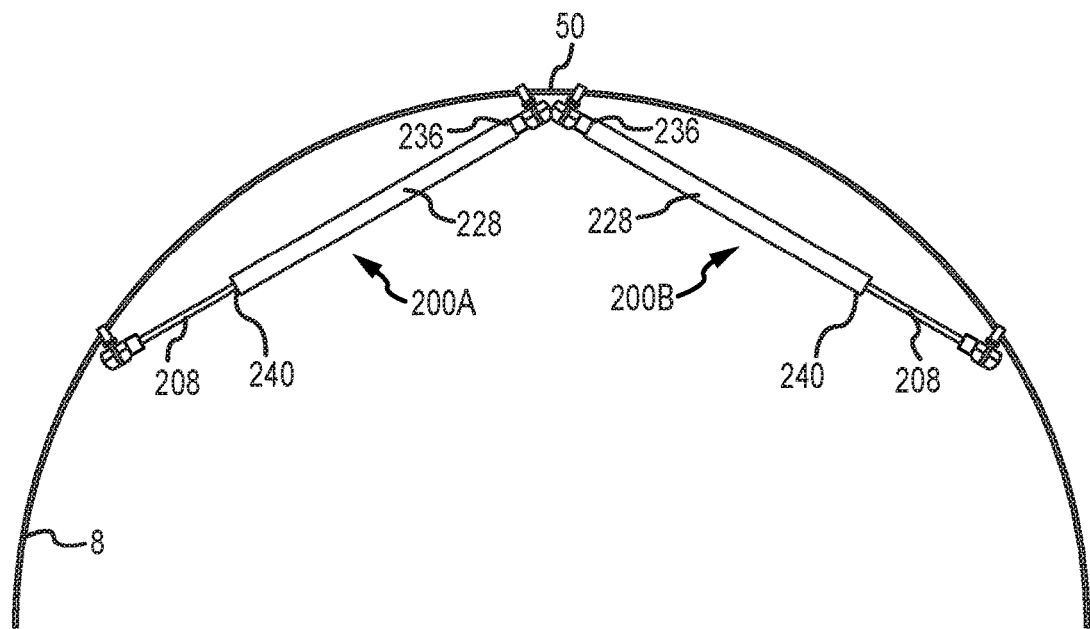
FIG. 18 is a cross-sectional view of a fairing with multiple mechanisms for increasing jettison clearance shown before the fairing has been jettisoned from the spacecraft (time=t0)

FIG. 18 is a cross-sectional view of a fairing 8 with two dampers 200A, 200B shown before the fairing 8 has been jettisoned from the spacecraft (i.e., at time=t0). The dampers 200A, 200B are interconnected to the interior surface of the fairing 8. The dampers 200A, 200B may be interconnected to the fairing 8 via fastening means such as bolts, screws, devises, or spherical bearings. For example, the dampers 200A, 200B could bolt onto the interior surface of the fairing 8 and be attached with some sort of spherical bearing or clevis attachment, such that the fairing 8 can freely breathe outward. Here, at time t0, the dampers 200A, 200B are in their static state. Also at this time, the piston of each damper 200A, 200B is positioned proximate the housing first end 236 and proximate the valve. The dampers 200A, 200B are positioned such that the housings 228 are positioned proximate the backbone region 50 of the fairing 8 and the rods 208 are positioned away from the backbone region 50. However, the dampers 200A, 200B could be positioned in the opposite direction with their rods 208 interconnected to the backbone region 50 of the fairing 8.

Figure 19:
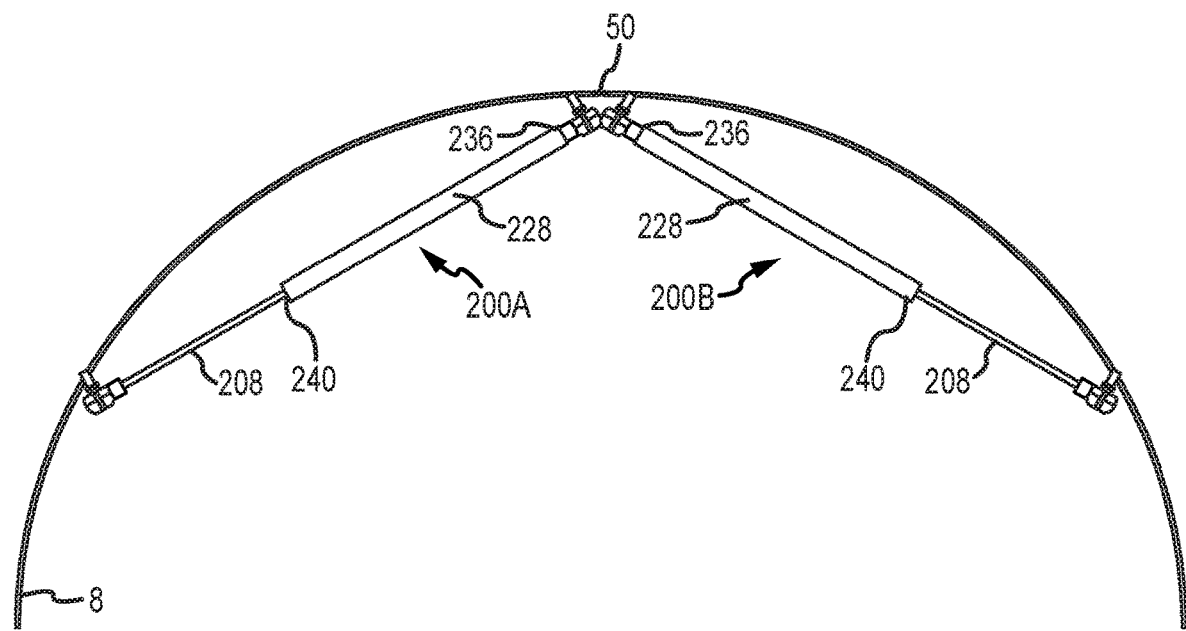
FIG. 19 is a cross-sectional view of the fairing and mechanisms for increasing jettison clearance of FIG. 18 shown after the fairing has been jettisoned from the spacecraft (time=t1).

FIG. 19 is a cross-sectional view of the fairing 8 and dampers 200A, 200B of FIG. 18 shown after the fairing 8 has been jettisoned from the spacecraft (time=t1). At this point in time the fairing 8 is breathing outward. Like the damper 200 of FIGS. 16-17, the dampers 200A, 200B are set such that they are very underdamped, or not damped at all, for movement in the expansion direction. Therefore, the dampers 200A, 200B do not inhibit the fairing 8 from breathing outward. At time t1, more of the rod 208 is positioned out of the housing 228 than in FIG. 18. Also like the damper 200 of FIGS. 16-17, the dampers 200A, 200B limit the amount the fairing 8 can breathe inward because they are very overdamped in the compression direction, meaning the dampers 200A, 200B prevent the pistons from moving back toward the housing first ends 236 and, thus, prevent the rods 208 from moving back into the housings 228. Therefore, the rods 208 remains extended, which prevents the portion of the fairing 8 interconnected to the dampers 200A, 200B from breathing inward and limits the amount the fairing can breathe inward overall.

Mechanisms for increasing jettison clearance according to embodiments of the present invention can be manufactured of various materials. For example, in one embodiment, the mechanism is mostly metal. In another embodiment, the mechanism is comprised of metal components, ceramic components, and/or composite material components.

Embodiments of the present invention can be manufactured using additive manufacturing (i.e., 3D printing) technology, typical machining, custom molded, or purchased as standard parts.

Additionally, various features/components of one embodiment may be combined with features/components of another embodiment. For example, features/components of one figure can be combined with features/components of another figure or features/components of multiple figures. To avoid repetition, every different combination of features has not been described herein, but the different combinations are within the scope of this disclosure. Additionally, if details (including angles, dimensions, etc.) about a feature or component are described with one embodiment or one figure, then those details can apply to similar features of components in other embodiments or other figures.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A mechanism for increasing jettison clearance, comprising:
   a band for interconnection to an inner surface of a jettisoned structure, the band comprising:
   an upper surface;
   a lower surface opposite the upper surface;
   an inner surface;
   an outer surface opposite the inner surface of the band and proximate the inner surface of the jettisoned structure;
   a plurality of apertures spaced inwardly from the outer surface of the band and extending from the upper surface to the lower surface; and
   a plurality of slits, wherein a slit extends from each aperture to the inner surface of the band and extends from the upper surface to the lower surface; and
   a plurality of blocking members, wherein each blocking member comprises:
   a biasing member;
   a locking mechanism; and
   a pin having a head on a first end, the head interconnected to an enlarged portion that is interconnected to a cylindrical portion extending to a second end;
   wherein each blocking member is positioned in each aperture,
   wherein the band has a first state where the outer surface of the band has a first curvature, and
   wherein the band has a second state where the outer surface of the band has a second curvature that is larger than the first curvature.

2. The mechanism for increasing jettison clearance of claim 1, wherein the head of the pin is positioned above the upper surface of the band and the biasing member is positioned below the lower surface of the band.

3. The mechanism for increasing jettison clearance of claim 1, wherein when the mechanism is in a first position the cylindrical portion of the pin is positioned in the aperture, and when the mechanism is in a second position the enlarged portion of the pin is positioned in the aperture.

4. The mechanism for increasing jettison clearance of claim 1, wherein the biasing member is a spring and the locking mechanism is a nut with a threaded through hole, and wherein the lower portion of the cylindrical portion has a threaded lower portion to threadingly engage the nut.

5. The mechanism for increasing jettison clearance of claim 1, wherein the mechanism is positioned on an interior surface of a fairing.

6. The mechanism for increasing jettison clearance of claim 5, wherein the mechanism is positioned on a backbone region of the fairing.

7. The mechanism for increasing jettison clearance of claim 1, wherein the enlarged portion of the pin comprises a tapered surface proximate the cylindrical portion to facilitate movement into the aperture.

8. The mechanism for increasing jettison clearance of claim 1, wherein the band increases an inward breathing stiffness of the fairing.

9. The mechanism for increasing jettison clearance of claim 1, wherein the biasing mechanism comprises a spring configured to force the enlarged body portion of the pin into the aperture when the size of the aperture is enlarged.

10. The mechanism for increasing jettison clearance of claim 9, further comprising a platform affixed to the pin proximate the second end, and the wherein the spring is positioned between the platform and the band portion.

11. The mechanism for increasing jettison clearance of claim 1, wherein the first curvature has a first radius of curvature proximate an apex of the jettisoned structure and the second curvature has a second radius of curvature proximate the apex of the jettisoned structure that is different than the first radius of curvature.

12. A mechanism for increasing jettison clearance, comprising:
   a band for interconnection to an inner surface of a jettisoned structure, the band comprising:
      an upper surface;
      a lower surface opposite the upper surface;
      an inner surface;
      an outer surface opposite the inner surface and proximate the inner surface of the jettisoned structure; and
      a plurality of apertures extending from the upper surface to the lower surface; and
   a plurality of blocking members, wherein each blocking member comprises:
      a biasing member having a spring;
      a locking mechanism; and
      a pin having a head on a first end, the head directly interconnected to a first enlarged portion that is directly interconnected to a second portion extending to a second end,
   wherein the blocking members are positioned in the apertures,
   wherein the band has a first state where the outer surface of the band has a first curvature having a first radius of curvature proximate an apex of the jettisoned structure, and
   wherein the band has a second state where the outer surface of the band has a second curvature having a second radius of curvature proximate the apex of the jettisoned structure that is different than the first radius of curvature.

13. The mechanism for increasing jettison clearance of claim 12, wherein when the mechanism is in a first position the second portion of the pin is positioned in the aperture, and when the mechanism is in a second position a size of the aperture is enlarged and the first enlarged portion of the pin is positioned in the aperture, and wherein the spring of the biasing mechanism is configured to force the enlarged portion of the pin into the aperture when the size of the aperture is enlarged.

14. The mechanism for increasing jettison clearance of claim 12, wherein the head of the pin is positioned above the band proximate the upper surface of the band and the biasing member is positioned below the band proximate the lower surface of the band.

15. The mechanism for increasing jettison clearance of claim 12, wherein the biasing member is a spring and the locking mechanism is a nut with a threaded through hole, and wherein the second portion has a threaded lower portion to threadingly engage the nut.

16. The mechanism for increasing jettison clearance of claim 12, wherein the mechanism is positioned on an interior surface of a fairing.

17. The mechanism for increasing jettison clearance of claim 12, wherein the first enlarged portion of the pin comprises a tapered surface proximate the second portion to facilitate movement of the first enlarged portion into the aperture.

18. The mechanism for increasing jettison clearance of claim 12, wherein the band further comprises a plurality of slits, and wherein a slit extends from each aperture to the inner surface of the band.

19. The mechanism for increasing jettison clearance of claim 12, wherein the second portion of the pin is cylindrical.

20. A mechanism for increasing jettison clearance of a jettisoned structure, the jettisoned structure having an inner surface, comprising:
   a band for interconnection to the inner surface of a jettisoned structure, the band comprising:
      an elongate body with an outer surface proximate the inner surface of the jettisoned structure;
      a plurality of apertures extending through the body from a first side of the body to a second side of the body; and
      a slit associated with each of the apertures in the plurality of apertures, wherein each slit extends from an associated aperture in a direction away from the jettisoned structure and away from the outer surface of the body, and wherein each slit is formed by two adjacent surfaces; and
   a plurality of blocking members, wherein each blocking member comprises:
      a biasing member;
      a locking mechanism; and
      a pin having a head on a first end, the head interconnected to a first enlarged portion that is interconnected to a second portion extending to a second end;
   wherein a blocking member is positioned in each aperture in the plurality of apertures,
   wherein the band has a first state where the outer surface of the body has a first curvature, the apertures in the plurality of apertures have a first diameter, and the slits are in a closed position such that in each slit the two adjacent surfaces are abutting one another, and
   wherein the band has a second state where the outer surface of the body has a second curvature that is larger than the first curvature, the apertures in the plurality of apertures have a second diameter larger than the first diameter, and the band separates along the slits such that in each slit the two adjacent surfaces are spaced apart from one another.

21. The mechanism for increasing jettison clearance of claim 20, wherein when the mechanism is in a pre jettisoned first position the band is in the first state and the second portion of the pin is positioned in the aperture, and when the mechanism is in a post-jettisoned second position the band is in the second state and the enlarged portion of the pin is positioned in the aperture.

22. The mechanism for increasing jettison clearance of claim 20, wherein the second portion is cylindrical.

* * * * *